United States Patent
Hayashi et al.

(10) Patent No.: US 9,139,308 B2
(45) Date of Patent: Sep. 22, 2015

(54) DISPLAY DEVICE AND UNMANNED HELICOPTER

(71) Applicant: Yamaha Hatsudoki Kabushiki Kaisha, Iwata-shi, Shizuoka (JP)

(72) Inventors: Toshiyuki Hayashi, Shizuoka (JP); Masanori Yoshihara, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/415,180

(22) PCT Filed: Jul. 18, 2013

(86) PCT No.: PCT/JP2013/069561
§ 371 (c)(1),
(2) Date: Jan. 16, 2015

(87) PCT Pub. No.: WO2014/014071
PCT Pub. Date: Jan. 23, 2014

(65) Prior Publication Data
US 2015/0183526 A1    Jul. 2, 2015

(30) Foreign Application Priority Data

Jul. 20, 2012   (JP) .................................. 2012-161591

(51) Int. Cl.
*B64D 47/02* (2006.01)
*B64C 39/02* (2006.01)
(Continued)

(52) U.S. Cl.
CPC .............. *B64D 47/02* (2013.01); *B64C 39/024* (2013.01); *B64D 45/00* (2013.01); *F21S 48/215* (2013.01);
(Continued)

(58) Field of Classification Search
CPC ...... B64D 47/02; B64D 45/00; B64C 39/024; B64C 2201/024; F21S 48/215; F21S 48/2212; F21V 5/007; F21V 5/043; F21V 5/045; F21V 5/046; F21V 3/02; F21V 3/049; G09F 21/06; G09F 21/10; G09F 21/14
See application file for complete search history.

(56) References Cited

U.S. PATENT DOCUMENTS 4,953,062 A * 8/1990 Sikora et al. .................. 362/263
6,244,728 B1    6/2001 Cote et al.
(Continued)

FOREIGN PATENT DOCUMENTS

JP     63-202794 A    8/1988
JP      1-119489 A    5/1989
(Continued)

OTHER PUBLICATIONS

Official Communication issued in corresponding Japanese Patent Application No. 2012-161591, mailed on Sep. 24, 2013.
(Continued)

*Primary Examiner* — Alan Cariaso
(74) *Attorney, Agent, or Firm* — Keating & Bennett, LLP

(57) ABSTRACT

A display device includes a light source portion including a plurality of LEDs, and cover portions that cover the light source portion. Each cover portion includes an opposed portion and a side wall portion. The opposed portion includes a straight-through portion which allows light emitted from the light source portion to travel straightly, whereas the side wall portion includes a first scatter portion which scatters the light emitted from the light source portion. A portion of the light emitted from the light source portion to the straight-through portion leaves the cover portion to the outside without being scattered. A different portion of the light emitted to the straight-through portion repeats reflection inside the opposed portion, reaches the side wall portion, and is scattered in the first scatter portion. Of the light emitted from the light source portion, a portion of the light reflected by an inner surface of the cover portion is directed to the side wall portion, and then scattered in the first scatter portion.

11 Claims, 17 Drawing Sheets

(51) Int. Cl.
    *F21S 8/10* (2006.01)
    *F21V 3/02* (2006.01)
    *F21V 3/04* (2006.01)
    *F21V 5/04* (2006.01)
    *B64D 45/00* (2006.01)
    *G09F 21/06* (2006.01)
    *G09F 21/14* (2006.01)

(52) U.S. Cl.
    CPC .............. *F21S 48/2212* (2013.01); *F21V 3/02* (2013.01); *F21V 3/049* (2013.01); *F21V 5/045* (2013.01); *G09F 21/06* (2013.01); *G09F 21/14* (2013.01); *B64C 2201/024* (2013.01); *B64C 2201/146* (2013.01)

(56) References Cited

U.S. PATENT DOCUMENTS

| | | | |
|---|---|---|---|
| 7,344,264 B2 * | 3/2008 | Tamaoki | 362/35 |
| 7,475,852 B2 * | 1/2009 | Hewitt et al. | 244/135 A |
| 2003/0072165 A1 | 4/2003 | Schulz et al. | |
| 2006/0268565 A1 * | 11/2006 | Chang | 362/540 |

FOREIGN PATENT DOCUMENTS

| | | |
|---|---|---|
| JP | 8-106260 A | 4/1996 |
| JP | 10-83148 A | 3/1998 |
| JP | 11-330562 A | 11/1999 |
| JP | 2000-114605 A | 4/2000 |
| JP | 2003-50553 A | 2/2003 |
| JP | 2003-516273 A | 5/2003 |
| JP | 3673423 B2 | 7/2005 |
| JP | 2007-95504 A | 4/2007 |
| JP | 4116476 B2 | 7/2008 |
| JP | 2010-163077 A | 7/2010 |

OTHER PUBLICATIONS

Official Communication issued in corresponding International Application PCT/JP2013/069561, mailed on Oct. 1, 2013.

* cited by examiner

DISPLAY DEVICE AND UNMANNED HELICOPTER

BACKGROUND OF THE INVENTION

1. Field of the Invention

The present invention relates to display devices and unmanned helicopters including the same. More specifically, the present invention relates to a display device including a light source portion including an LED, and a cover portion which allows light from the light source portion to pass therethrough. The present invention also relates to an unmanned helicopter including the display device.

2. Description of the Related Art

Conventionally, display devices are used in unmanned helicopters. For example, JP-B No. 4116476 discloses a display device for an unmanned helicopter, which includes a GPS display lamp, a warning lamp, and a mounting frame for mounting the GPS display lamp and the warning lamp. Each of the GPS display lamp and the warning lamp includes a plurality of LEDs.

In this display device, it is possible to turn ON the GPS display lamp and the warning lamp separately from each other. Therefore, the operator of the unmanned helicopter can recognize an operation status of GPS control and an abnormality status of the helicopter without confusion.

The display device according to JP-B No. 4116476 uses a plurality of LEDs disposed in the same orientation (facing rearward in the case of the unmanned helicopter disclosed in JP-B No. 4116476). This arrangement improves the visibility of the display device from the rear at a distance. However, in this case, the visibility of the display device from the sides is decreased. Display devices for unmanned helicopters require especially good visibility in a wider range (angle) since the operator often varies the flying direction and/or the attitude of the helicopter during operation.

SUMMARY OF THE INVENTION

Therefore, preferred embodiments of the present invention provide a display device which has a good visibility from a distance and improved visibility from a wide range, and provide an unmanned helicopter including the same.

According to a preferred embodiment of the present invention, a display device includes a light source portion including an LED which emits light at least in a first direction, and a cover portion covering the light source portion. In this display device, the cover portion includes an opposed portion opposed to the light source portion in the first direction of the light source portion, and a side wall portion extending from an outer edge of the opposed portion in a reverse direction from the first direction. Further, the opposed portion includes a straight-through portion which allows light emitted from the light source portion to travel straightly, and the side wall portion includes a first scatter portion which scatters the light emitted from the light source portion.

It should be noted here that the "side wall portion extending in a reverse direction from the first direction" is not limited to a side wall portion which extends in exactly the reverse direction from the first direction, but includes any side wall portion which extends at least in the reverse direction. In other words, the present invention may include a side wall portion extending obliquely with respect to the reverse direction.

In a preferred embodiment of the present invention, an opposed portion of the cover portion is provided in the first direction of the light source portion. The opposed portion includes a straight-through portion which allows light to travel straightly. A portion of the light emitted from the light source portion is directed to the straight-through portion of the opposed portion. A portion of the light directed to the straight-through portion travels straightly through the straight-through portion, and then out of the cover portion to an outside. In other words, a portion of the light emitted from the light source portion to the opposed portion passes through the cover portion and to the outside without being scattered in the cover portion. This arrangement improves the visibility of the display device from a distance in the first direction. A different portion of the light directed to the straight-through portion of the opposed portion repeats reflection inside the opposed portion, and reaches the side wall portion. A portion of the light which reaches the side wall portion is scattered in the first scatter section. Of the light emitted from the light source portion, a portion of the light is reflected by an inner surface of the cover portion and is directed to the side wall portion. A portion of the light which is directed to the side wall portion is scattered in the first scatter section. This improves the visibility of the display device from directions across the first direction (from a side, for example). As a result, it is possible to improve the visibility of the display device in a wide range while improving the visibility of the display device from a distance. In the cover portion, if the opposed portion and the side wall portion are provided by separate members, it is preferable that the light source portion should be disposed at a place which ensures that at least a portion of light emitted from the light source portion is directed directly to the side wall portion. This scatters the light from the light source portion more reliably in the first scatter section.

In preferred embodiments of the present invention, side directions preferably include left-right directions and up-down directions.

Preferably, the opposed portion further includes a second scatter portion which scatters the light emitted from the light source portion. In this case, it is possible to scatter another portion of the light emitted from the light source portion in the second scatter portion. This further improves the visibility of the display device from directions (especially from sides) other than from the first direction.

Further preferably, the second scatter portion overlaps the light source portion when viewed from the first direction. In this case, it is possible to reliably scatter a portion of the light which is emitted in the first direction from the light source portion with the second scatter portion.

Further preferably, the light source portion includes a plurality of LEDs, and the straight-through portion overlaps a portion of the plurality of LEDs whereas the second scatter portion overlaps another portion of the plurality of LEDs when viewed from the first direction. In this case, light emitted by a portion of the plurality of LEDs in the first direction is directed to the straight-through portion, and is allowed to travel out of the cover portion without being scattered in the opposed portion. The arrangement sufficiently improves the visibility of the display device from a distance in the first direction. On the other hand, light emitted from another portion of the plurality of LEDs in the first direction is directed to the second scatter portion, and is scattered in the second scatter portion. This also sufficiently improves the visibility of the display device from directions (especially from sides) other than from the first direction.

Preferably, the light source portion includes a first light source portion, and a pair of second light source portions which emit light of a different color from that emitted by the first light source portion, the first light source portion is located between the pair of second light source portions and each of the second light source portions is located between the first light source portion and the side wall portion when viewed from the first direction, and the second scatter portion overlaps the first light source portion when viewed from the first direction. In this case, when viewed from the first direction, the pair of second light source portions are closer to the side wall portion than is the first light source portion. This improves the visibility of light emitted from the pair of second light source portions from the sides. Also, it is possible to scatter a portion of the light which is emitted in the first direction from the first light source portion with the second scatter portion. This also improves the visibility of the light emitted from the first light source portion from the sides.

The case where "the first light source portion is located between the pair of second light source portions" includes a case where the first light source portion and the pair of second light source portions are located on a straight line, a case where the first light source portion is located at a higher or a lower position than the pair of second light source portions, and also a case where one of the second light source portions is located at a higher or a lower position than the other of the second light source portions and the first light source portion.

Further preferably, the second scatter portion further overlaps the second light source portion when viewed from the first direction. In this case, it is possible to reliably scatter not only the light which is emitted from the first light source portion in the first direction but also the light which is emitted from the second light source portion in the first direction in the second scatter portion. This further improves the visibility of the light emitted from the second light source portion from the sides.

Further preferably, the pair of second light source portions include warning LEDs. When viewed from the first direction, if the pair of second light source portions are closer to the side wall portion than is the first light source portion, the light which is emitted from the pair of second light source portions has better visibility from the sides than does the light which is emitted from the first light source portion. Therefore, in this case, the arrangement that the pair of second light source portions include warning LEDs improves the visibility of the light which is emitted from the warning LEDs from the sides.

Preferably, the second scatter portion includes a bent portion. In this case, it is possible to scatter the light emitted from the light source portion also in the bent portion and therefore it is possible to scatter light with a simple arrangement.

Further preferably, the first scatter portion includes a first non-flat portion on an inner surface of the side wall portion. In this case, the arrangement prevents dust and dirt from depositing on the first non-flat portion. This makes it easy to clean the cover portion.

Further preferably, the second scatter portion includes a second non-flat portion on an inner surface of the opposed portion. In this case, the arrangement prevents dust and dirt from depositing on the second non-flat portion. This makes it easy to clean the cover portion.

According to another preferred embodiment of the present invention, a remote-controlled unmanned helicopter is provided with a display device which has good visibility so that the operator appropriately understands the state of the unmanned helicopter. Therefore, the display device described thus far, which has an improved visibility from a distance and an improved visibility from a wide range, is suitably applicable to unmanned helicopters.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
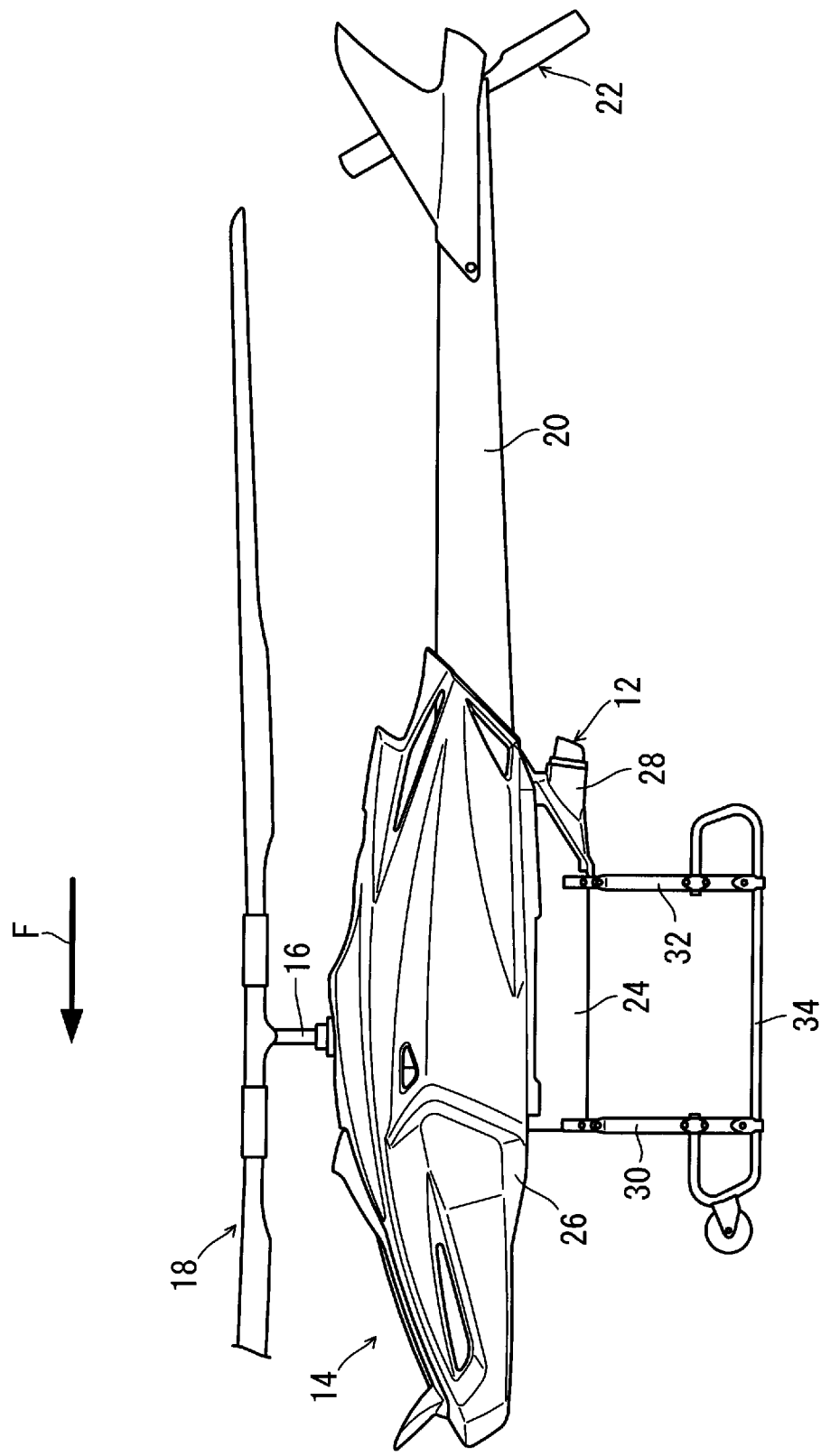
FIG. 1 is a side view of an unmanned helicopter equipped with a display device according to a preferred embodiment of the present invention.

Hereinafter, preferred embodiments of the present invention will be described with reference to the drawings. Hereinafter, an unmanned helicopter 10 which includes a display device 12 according to a preferred embodiment of the present invention will be described. It is noted that the terms front and rear, left and right, up and down as used in the description of preferred embodiments are determined from a basic attitude of the unmanned helicopter 10 (an attitude of the unmanned helicopter 10 when its mast 16 is parallel or substantially parallel to the vertical direction). In the drawings, Arrow F indicates a forward direction, Arrow R indicates a right direction, and Arrow L indicates a left direction.

FIG. 1 is a side view which shows the unmanned helicopter 10 (hereinafter, will be simply called helicopter 10). Referring to FIG. 1, the helicopter 10 includes the display device 12, a main body 14, the mast 16, a main rotor 18, a tail body 20, and a tail rotor 22. Details of the display device 12 will be described below.

The main body 14 includes a frame 24, a body cover 26, an under cover 28, a pair of leg portions 30 (FIG. 1 shows only the left leg portion 30), a pair of leg portions 32 (FIG. 1 shows only the left leg portion 32), and a pair of skids 34 (FIG. 1 shows only the left skid 34).

The frame 24 is preferably rectangular or substantially rectangular in a front view, and extends in a fore-aft direction. The body cover 26 is supported by the frame 24. The body cover 26 preferably includes therein, various unillustrated devices (such as an engine, a transmission, a radiator, a control device, and an attitude detector).

The under cover 28 is attached to the tail body 20 and the frame 24 so as to cover a portion of the display device 12. Details of the under cover 28 will be described below. The pair of leg portions 30 are attached to two side surfaces of the frame 24. The pair of leg portions 32 are attached to the two side surfaces of the frame 24 at more rearward positions than the pair of leg portions 30. The pair of skids 34 are attached side by side in a left-right direction to the pair of leg portions 30 and the pair of leg portions 32. Specifically, the skid 34 on one side (left side) is attached to the leg portions 30, 32 on one side (left side), whereas the skid 34 (not illustrated) on the other side (right side) is attached to the leg portions 30, 32 (not illustrated) on the other side (right side).

The mast 16 protrudes upward from the body cover 26 and is rotatable. The mast 16 includes an upper end portion where the main rotor 18 is fixed. Thus, the mast 16 and the main rotor 18 rotate integrally with each other.

The tail body 20 is preferably cylindrical or substantially cylindrical, and extends to a more rearward position than the main body 14. The tail body 20 includes a forward end portion which is supported by the frame 24 inside the body cover 26. The tail rotor 22 is rotatable and is located at a rearward end portion of the tail body 20. Inside the tail body 20, a connecting member (not illustrated) is provided to connect the above-mentioned transmission (not illustrated) and the tail rotor 22 to each other. In the present preferred embodiment, the connecting member is provided by a rotating shaft (not illustrated) extending in a fore-aft direction. The tail rotor 22 rotates as the rotating shaft rotates.

The engine (not illustrated) generates a driving force, which is transmitted to the transmission (not illustrated), and then supplied to the mast 16 and the rotating shaft (not illustrated). This causes rotation of the mast 16 and the rotating shaft (not illustrated) causing the main rotor 18 and the tail rotor 22 to rotate.

Figure 2:
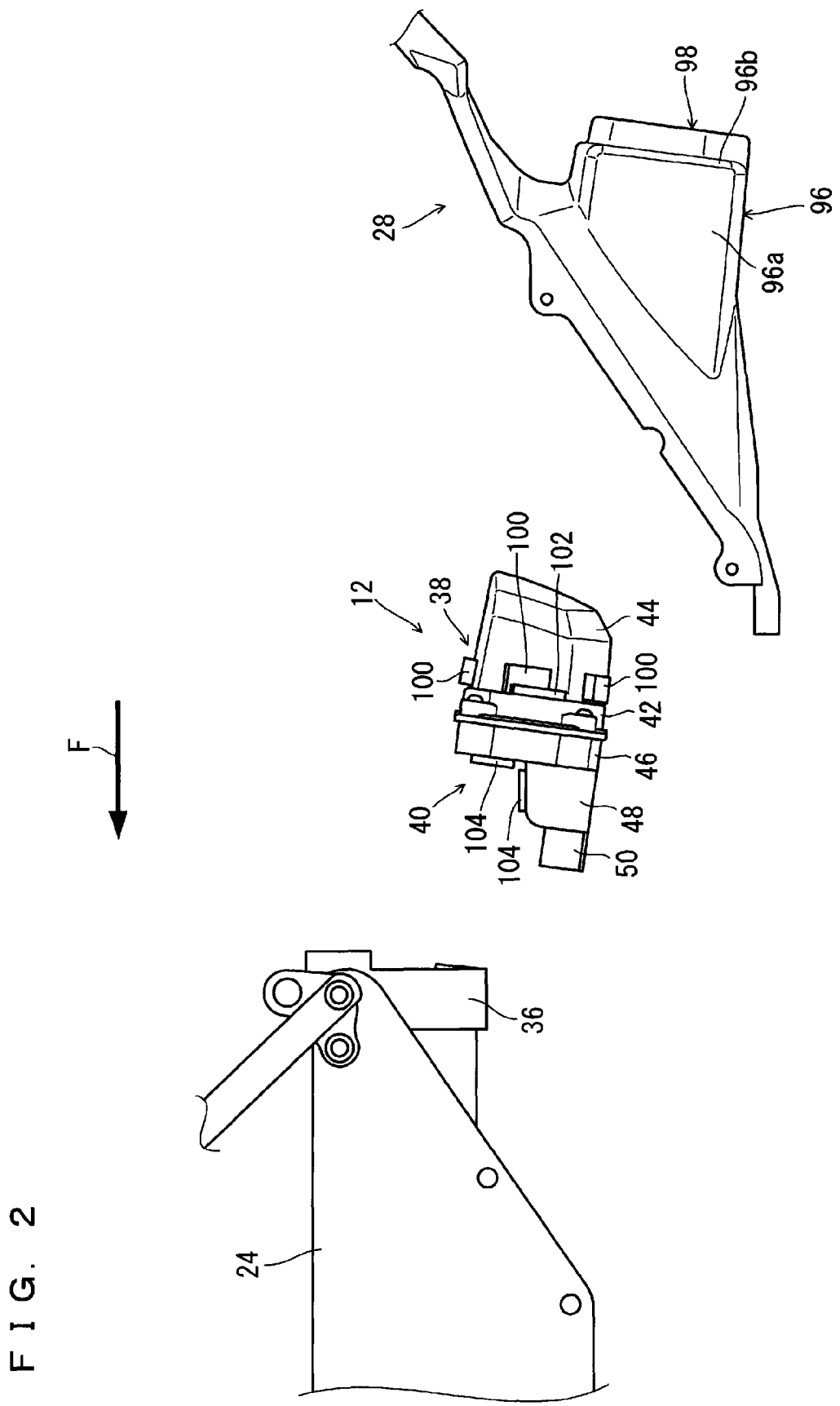
FIG. 2 is a side view showing the display device, a frame, and an under cover.

FIG. 2 is a side view showing the display device 12, the frame 24, and the under cover 28. Referring to FIG. 2, the frame 24 includes a rearward end portion which supports a battery box 36. The battery box 36 supplies electric power to electric components (including the display device 12) of the helicopter 10.

Figure 3:
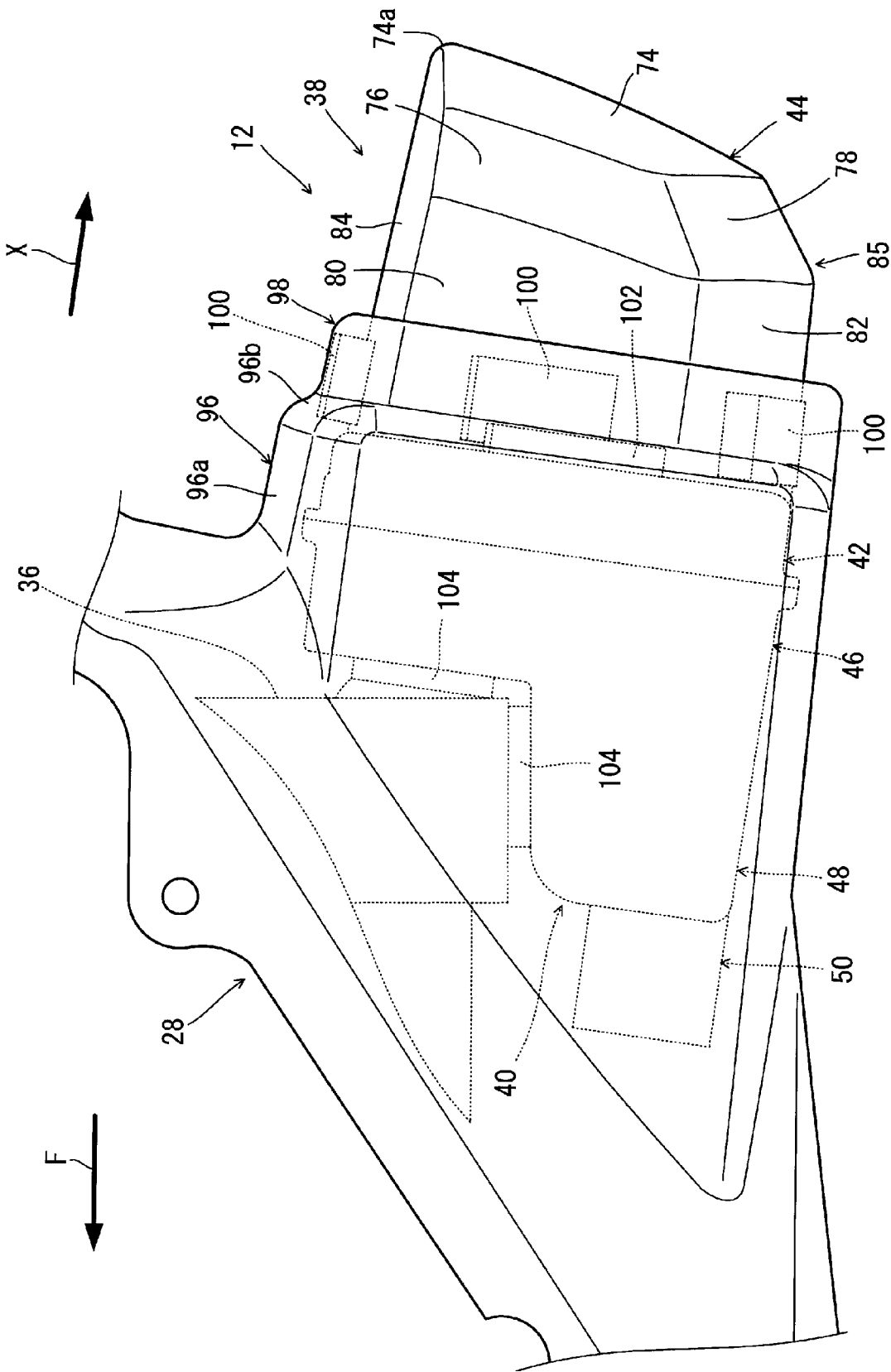
FIG. 3 is an enlarged side view showing a relationship between the display device, the under cover, and a battery box.
Figure 4:
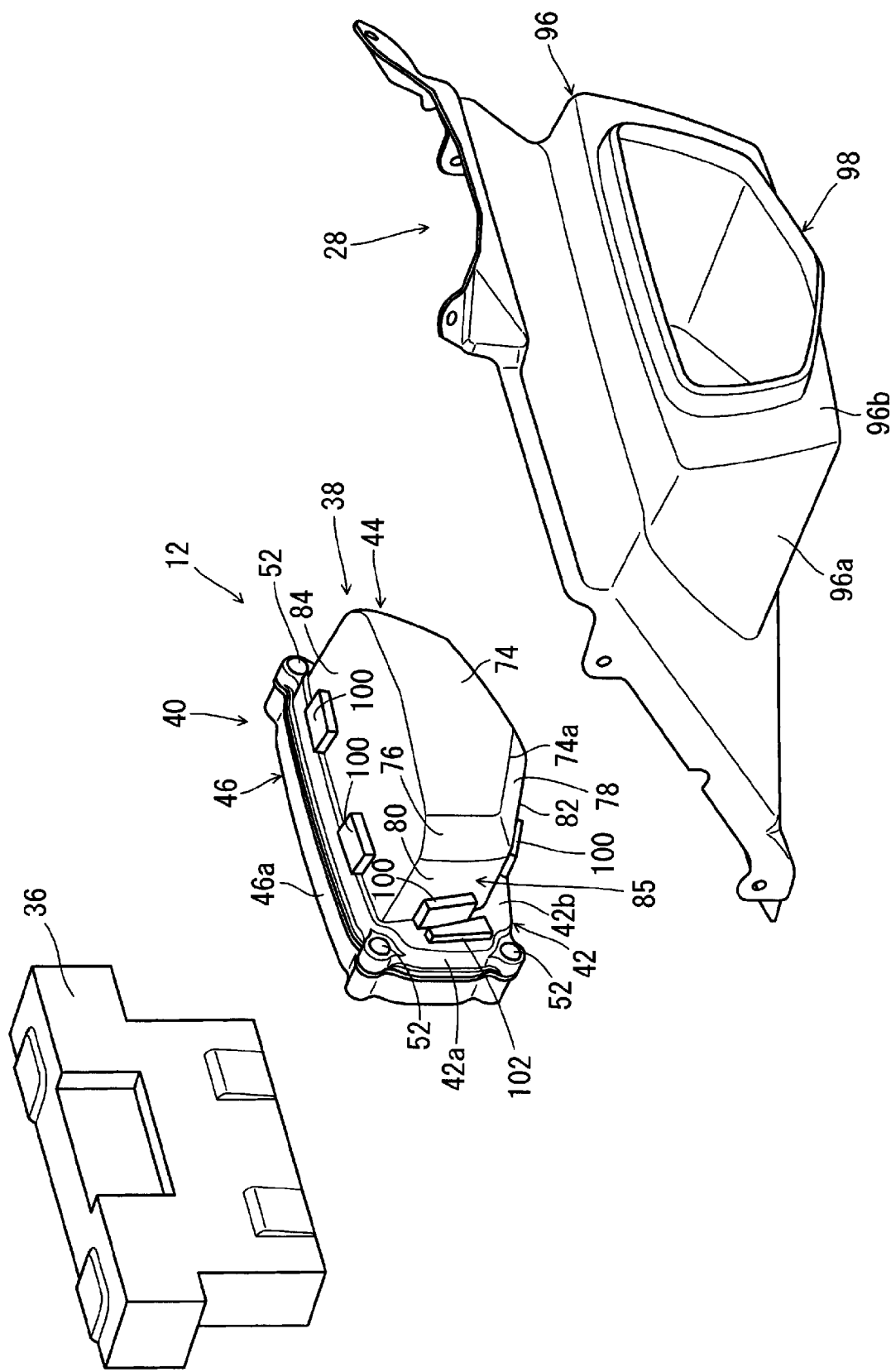
FIG. 4 is a perspective view showing the display device, the under cover, and the battery box.
Figure 5:
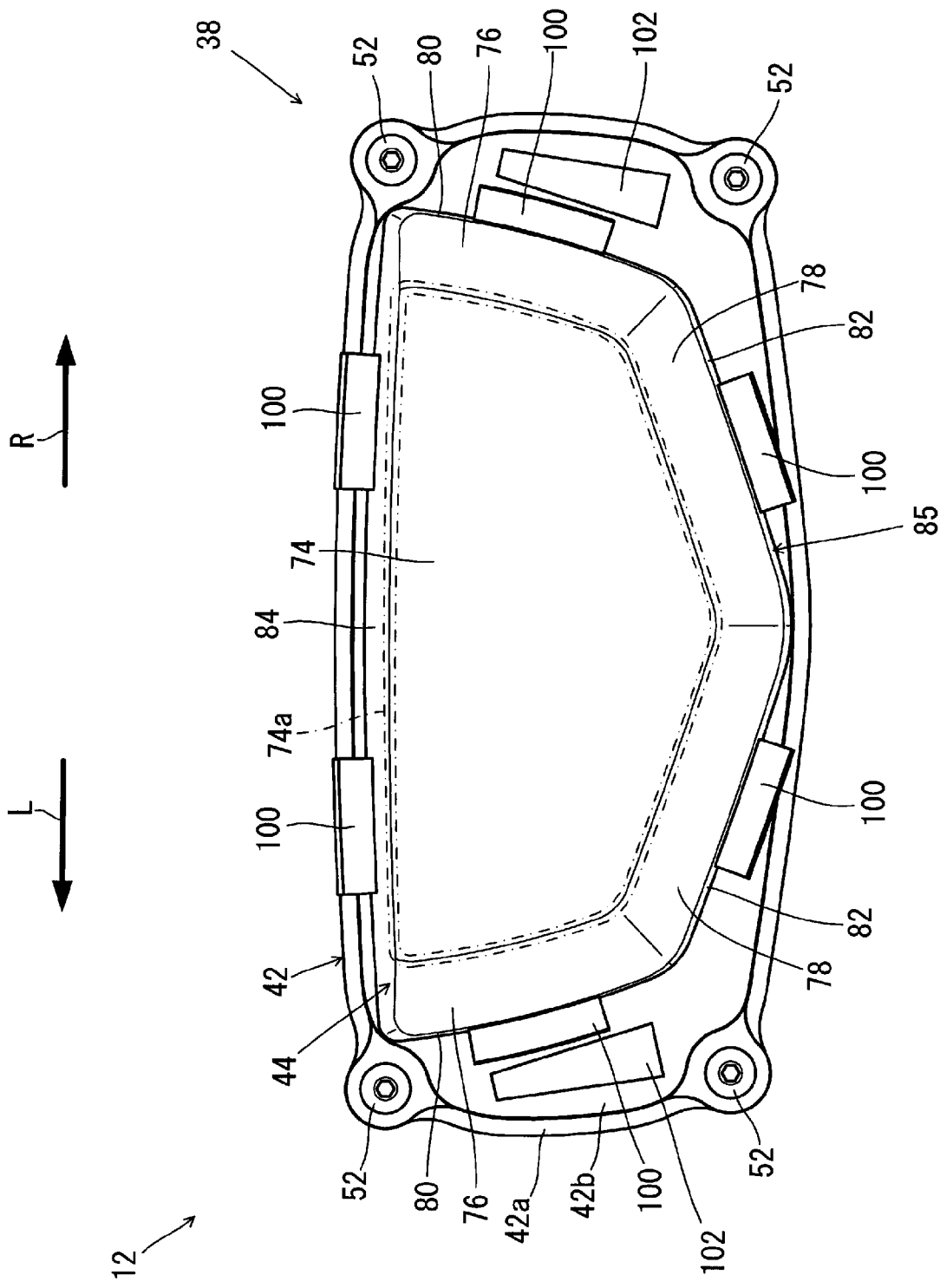
FIG. 5 is a rear view of the display device.
Figure 6:
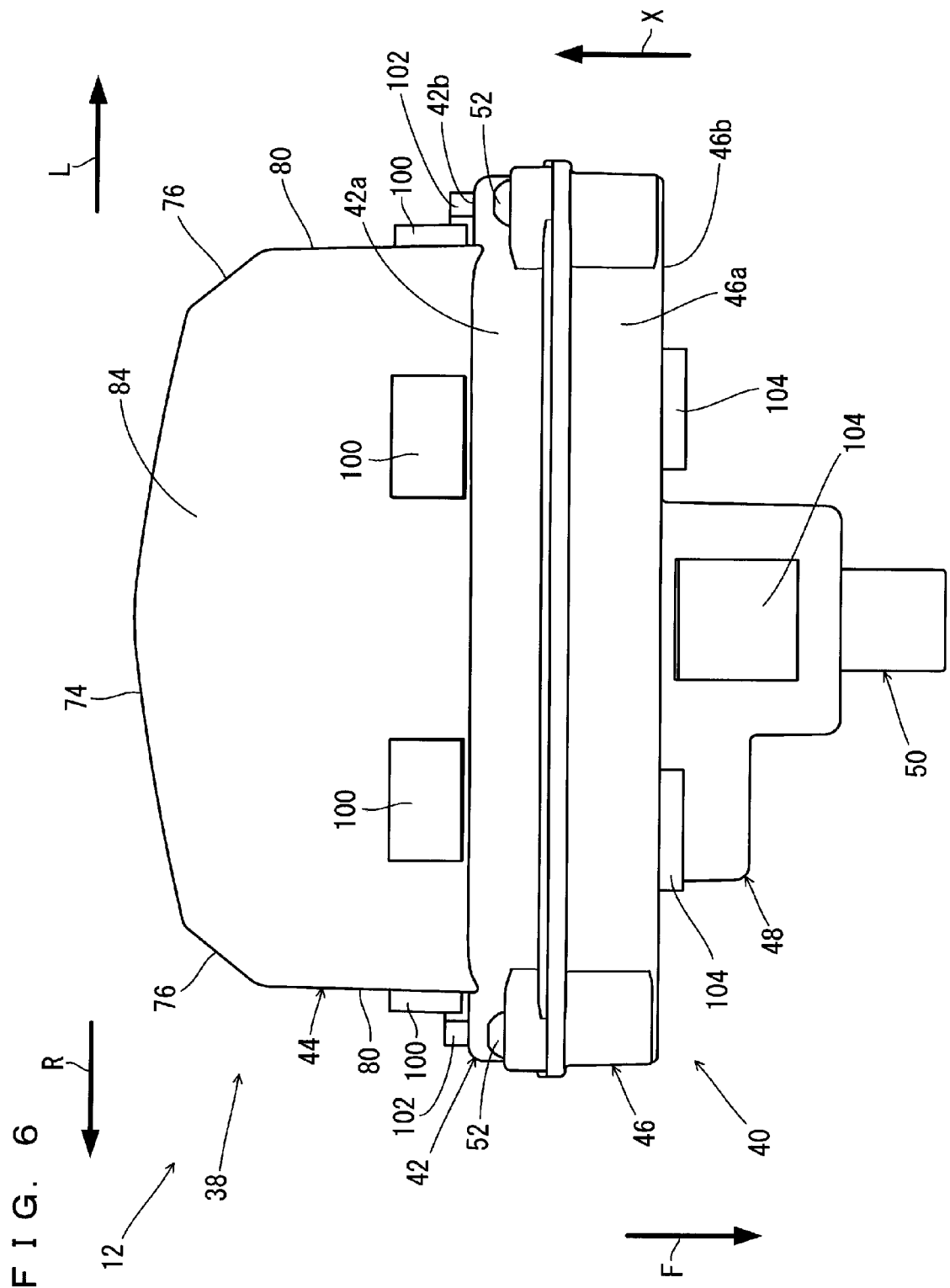
FIG. 6 is a plan view of the display device.
Figure 7:
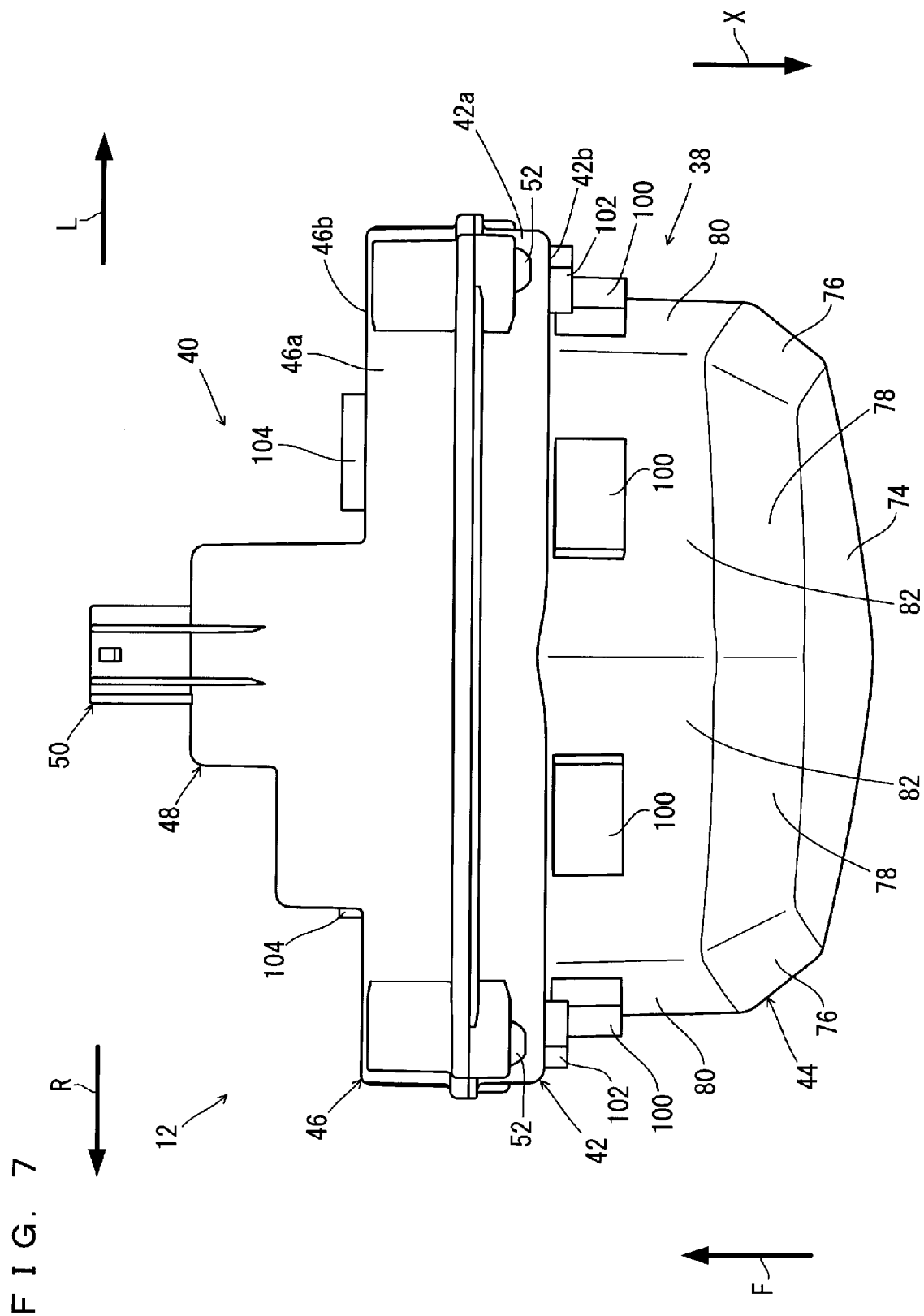
FIG. 7 is a bottom view of the display device.
Figure 8:
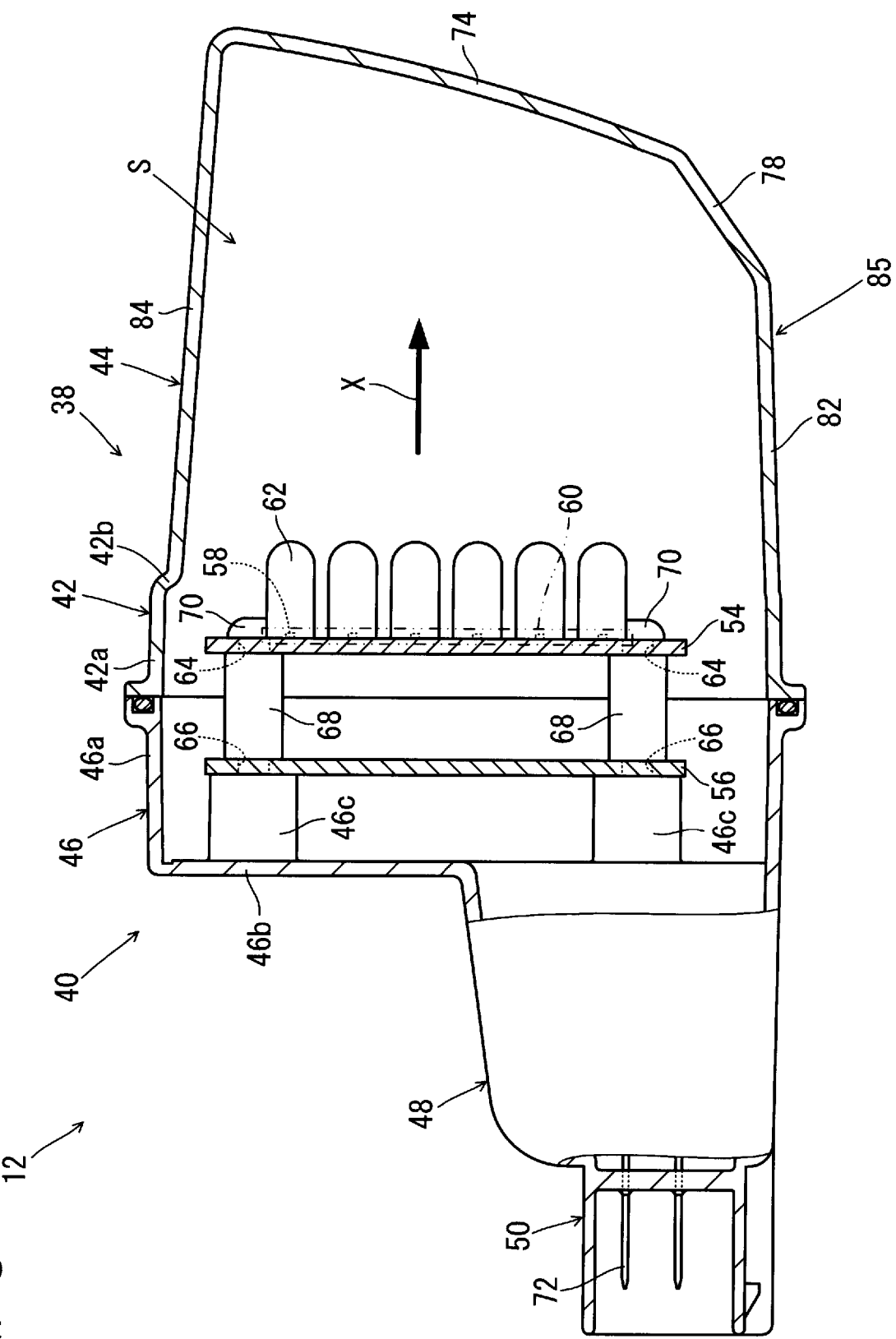
FIG. 8 is an illustrative side view showing an internal structure of the display device.

FIG. 3 is an enlarged side view showing a relationship between the display device 12, the under cover 28, and the battery box 36, whereas FIG. 4 is a perspective view showing the display device 12, the under cover 28, and the battery box 36. FIG. 5 is a rear view showing the display device 12, FIG. 6 is a plan view showing the display device 12, and FIG. 7 is a bottom view showing the display device 12. FIG. 8 is an illustrative side view showing an internal structure of the display device 12. In FIG. 8, the internal structure of the display device 12 is illustrated in a simplified manner in order to avoid a complicated view. In the present preferred embodiment, a front surface of the display device 12 is a surface which appears in a view of the display device 12 taken from Arrow X direction (see FIG. 3). A front surface, a back surface, a plane surface, a bottom surface, and side surfaces which appear in FIG. 5 and the following drawings are defined accordingly to this front surface. In the present preferred embodiment, Arrow X direction is a direction perpendicular or substantially perpendicular to an LED substrate 54 which will be described below. Also, as shown in FIG. 3, in the present preferred embodiment, Arrow X direction is a direction which is slightly inclined downward with respect to the fore-aft direction.

Referring to FIG. 2 through FIG. 8, the display device 12 includes a cover portion 38 and a cover portion 40. The cover portion 38 includes a flange portion 42 and a translucent portion 44 protruding rearward from the flange portion 42. Referring to FIG. 8, each of the flange portion 42 and the translucent portion 44 is hollow.

In the present preferred embodiment, the flange portion 42 is made of, for example, a carbonate resin (such as polycarbonate (PC)), an acrylic resin (such as polymethylmethacrylate (PMMA)), or a polyamide (PA) resin. The translucent portion 44 lets light, which is emitted from a light source portion 60 to be described below, pass therethrough. The translucent portion 44 is made of, for example, a carbonate resin (such as polycarbonate (PC)), an acrylic resin (such as polymethylmethacrylate (PMMA)), or a polyamide (PA) resin. In the present preferred embodiment, the translucent portion 44 is made of the same material as is the flange portion 42. Details of the translucent portion 44 will be described below.

Referring to FIG. 2, FIG. 3, and FIG. 6 through FIG. 8, the cover portion 40 includes a flange portion 46, a projected portion 48 protruding forward from the flange portion 46, and a connecting portion 50 protruding forward from the projected portion 48. Referring to FIG. 8, each of the flange portion 46, the projected portion 48, and the connecting portion 50 is hollow. The cover portion 40 is made of, for example, a polybutylene terephthalate (PBT) resin, an acrylonitrile butadiene styrene copolymerization synthetic resin (ABS resin), or aluminum (Al).

Referring to FIG. 4 through FIG. 8, the flange portion 42 includes a frame shaped circumferential wall portion 42a and a plate shaped rear wall portion 42b. The rear wall portion 42b connects a rear edge of the circumferential wall portion 42a and a front edge of the translucent portion 44 to each other. Referring to FIG. 6 through FIG. 8, the flange portion 46 includes a frame shaped circumferential wall portion 46a and a plate shaped front wall portion 46b. The front wall portion 46b connects a front edge of the circumferential wall portion 46a and a rear edge of the projected portion 48 to each other.

The circumferential wall portion 46a is shaped to correspond to the circumferential wall portion 42a. Referring to FIG. 4 through FIG. 7, the circumferential wall portion 42a and the circumferential wall portion 46a are fixed together with a plurality of screws 52, for example. In the present preferred embodiment, four screws 52 preferably are used to fix four corners of the circumferential wall portion 42a and four corners of the circumferential wall portion 46a to each other, for example. Thus, the cover portion 38 and the cover portion 40 are fixed to each other.

Referring to FIG. 8, the cover portion 38 and the cover portion 40 provide an internal space S of the display device 12. In the internal space S, an LED substrate 54 and a control substrate 56 are provided.

Figure 9:
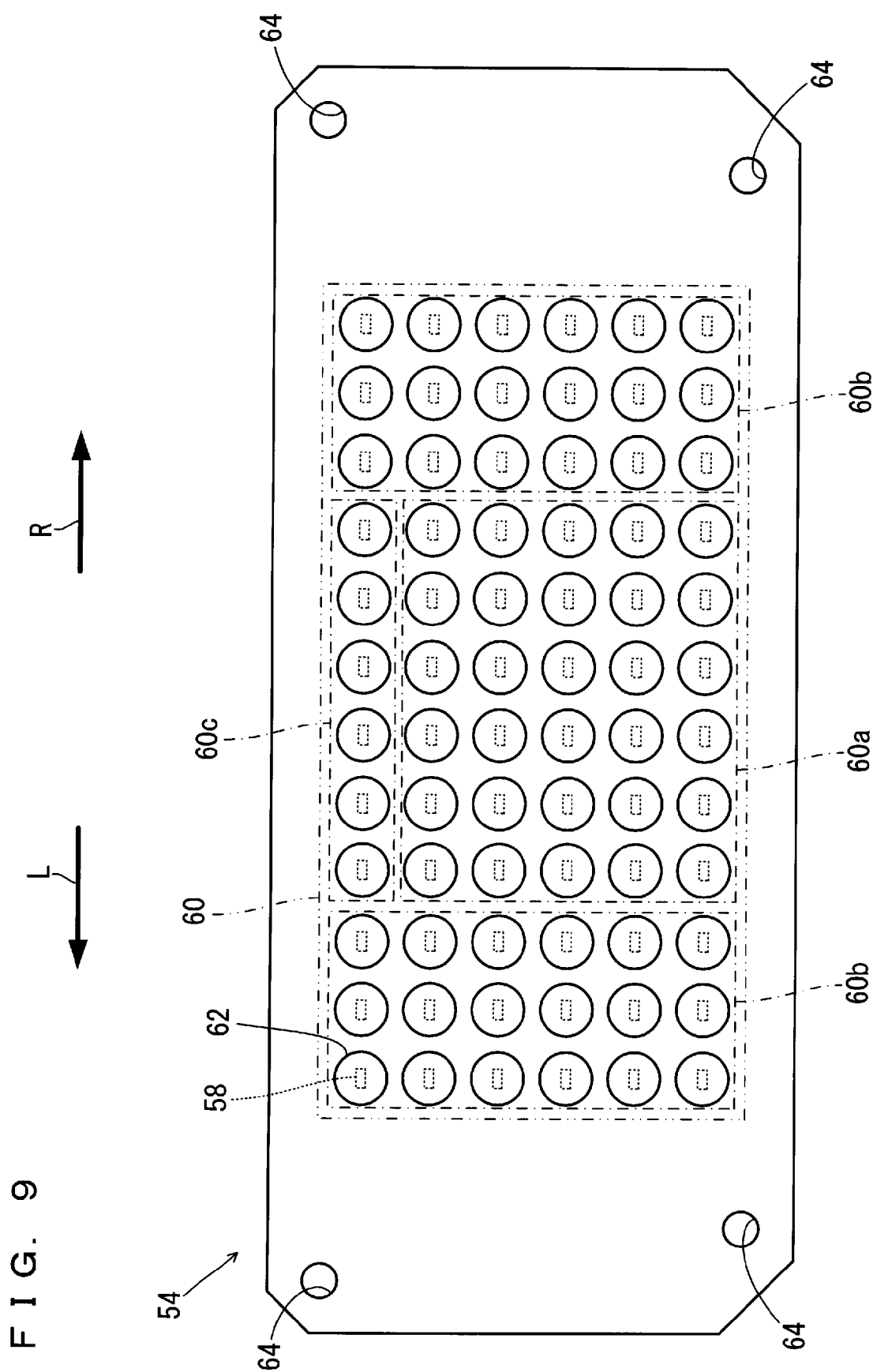
FIG. 9 is a rear view of an LED substrate.

FIG. 9 is a rear view of the LED substrate 54. FIG. 8 and FIG. 9 show the LED substrate 54 in a simplified manner in order to avoid complicating the drawing.

Referring to FIG. 9, the LED substrate 54 is preferably rectangular or substantially rectangular. Referring to FIG. 8 and FIG. 9, the LED substrate 54 includes a plurality of LEDs (Light Emitting Diodes) 58. Referring to FIG. 9, in the present preferred embodiment, the plurality of LEDs 58 are disposed preferably in twelve arrays extending in the left-right direction, with each array preferably including six of the LEDs 58 arranged in an up-down direction, for example. In other words, the LED substrate 54 preferably includes seventy-two LEDs 58, for example.

The LED substrate 54 includes the light source portion 60. The light source portion 60 includes a plurality of LEDs 58. In the present preferred embodiment, the light source portion 60 preferably includes the above-described seventy-two LEDs 58. Referring to FIG. 8, the light source portion 60 emits light at least in Arrow X direction. In the present preferred embodiment, each LED 58 emits light at least in Arrow X direction.

Referring to FIG. 9, the light source portion 60 includes a first light source portion 60a, a plurality (for example, two, in the present preferred embodiment) of second light source portions 60b, and a third light source portion 60c. The plurality of second light source portions 60b are disposed to sandwich the first light source portion 60a from the left and right. The third light source portion 60c is disposed above the first light source portion 60a and is sandwiched by the plurality of second light source portions 60b from the left and right. In the present preferred embodiment, the first light source portion 60a includes thirty of the LEDs 58 in the light source portion 60, located in six arrays (consisting of thirty-six LEDs 58) in an intermediate region, excluding six of the LEDs 58 located in an upper end region. Of the two second light source portions 60b, the right-side second light source portion 60b includes three arrays (eighteen LEDs 58) in a right end region of the light source portion 60. The left-side second light source portion 60b includes three arrays (eighteen LEDs 58) in a left end region of the light source portion 60, for example. The third light source portion 60c includes six LEDs 58 in the upper end region of the six arrays (thirty-six LEDs 58) in the intermediate region of the light source portion 60, for example.

The plurality of LEDs 58 which belong to the first light source portion 60a, the plurality of LEDs 58 which belong to the second light source portions 60b, and the plurality of LEDs 58 which belong to the third light source portion 60c may emit light in different colors from each other, or light of the same color. In the present preferred embodiment, for example, each LED 58 in the first light source portion 60a illuminates in orange, each LED 58 in each of the second light source portions 60b illuminates in red, and the LED 58 in the third light source portion 60c illuminates in blue or green.

In the present preferred embodiment, each LED 58 in each of the second light source portions 60b functions as a light source for warning purposes to provide an emergency warning signal to the operator of the helicopter 10. Specifically, the second light source portions 60b let the operator of the helicopter 10 know of an essential problem, for example, regarding the flight of the helicopter 10 (such as a failure of various devices including the engine and the control device). Each LED 58 in the first light source portion 60a functions as a light source for cautioning purposes to provide a caution sign, which is not as urgent as the warning sign, to the operator of the helicopter 10. Specifically, the first light source portion 60a provides the operator of the helicopter 10, for example, signals such as one indicating a low fuel level, abnormal speed (e.g., overspeed) of the helicopter 10, and a signal reception malfunction of a GPS receiver (not illustrated). Each LED 58 in the third light source portion 60c functions as a light source to inform the operator the state of the helicopter 10 and to provide signs from the helicopter 10 to the operator of the helicopter 10. Specifically, the third light source portion 60c provides the operator of the helicopter 10, for example, with signals such as a signal indicating a control mode of the GPS receiver (not illustrated) mounted on the helicopter 10, a control state of the GPS receiver, and an operation status of a sprayer (not illustrated) mounted on the helicopter 10.

Referring to FIG. 8 and FIG. 9, a plurality (for example, seventy-two, in the present preferred embodiment) of sealing portions 62 are provided to seal the plurality of LEDs 58, respectively. The sealing portions 62 extend perpendicularly or substantially perpendicularly with respect to the LED substrate 54. In the present preferred embodiment, the sealing portions 62 are preferably columnar or substantially columnar, and each includes a tip portion which is hemispherical or substantially hemispherical. The sealing portions 62 allow, for example, the light emitted from the LEDs 58 to pass therethrough without scattering. The sealing portions 62 are made of, for example, a carbonate resin (such as polycarbonate (PC)), an acrylic resin (such as polymethylmethacrylate (PMMA)), a polyamide (PA) resin, or glass.

Referring to FIG. 9, the LED substrate 54 includes four corners each including a through-hole 64. Referring to FIG. 8, the control substrate 56 preferably has the same shape (for example, rectangular or substantially rectangular) as the LED substrate 54. The control substrate 56 includes four corners each provided with a through-hole 66 (FIG. 8 only shows two of the through-holes 66). The four through-holes 66 in the control substrate 56 are located at positions corresponding to the four through-holes 64 in the LED substrate 54. The LED substrate 54 and the control substrate 56 are electrically connected to each other with unillustrated connection members (e.g., electric wires). The control substrate 56 controls the plurality of LEDs 58 of the LED substrate 54. The control substrate 56 is preferably a conventional control substrate, so details of the control substrate 56 will not be described.

The flange portion 46 of the cover portion 40 includes a plurality of cylindrical boss portions 46c. In the present preferred embodiment, four boss portions 46c preferably are provided correspondingly to the four through-holes 64 in the LED substrate 54 and four through-holes 66 in the control substrate 56. The boss portions 46c extend perpendicularly or substantially perpendicularly from the front wall portion 46b inside the internal space S.

A plurality of collars 68 are sandwiched by the LED substrate 54 and the control substrate 56. In the present preferred embodiment, four collars 68 preferably are provided correspondingly to the four through-holes 64 in the LED substrate 54 and four through-holes 66 in the control substrate 56, for example. The LED substrate 54, the collars 68, and the control substrate 56 are fixed to the plurality of boss portions 46c with a plurality (for example, four, in the present preferred embodiment) of screws 70, for example. Specifically, each screw 70 is inserted through the through-hole 64, the collar 68 and the through-hole 66, into the boss portion 46c, and a tip portion of the screw 70 is threaded into the boss portion 46c.

The connecting portion 50 includes a plurality (four, for example) of terminals 72. The plurality of terminals 72 are electrically connected to the control substrate 56 via unillustrated connection members (such as electric wires) laid inside the projected portion 48. Without going into detail, the plurality of terminals 72 are electrically connected to the control device disposed inside the battery box 36 (see FIG. 2) and the body cover 26 (FIG. 1). Thus, electric power is supplied to the control substrate 56 and the LED substrate 54, and control signals are supplied to the control substrate 56.

Hereinafter, details of the translucent portion 44 in the cover portion 38 will be described.

Referring to FIG. 3 through FIG. 5, the translucent portion 44 is symmetrical in the left-right direction. The translucent portion 44 includes an opposed portion 74, a pair of first side wall portions 76, a pair of second side wall portions 78, a pair of third side wall portions 80, a pair of fourth side wall portions 82, and a fifth side wall portion 84. In the present preferred embodiment, the pair of first side wall portions 76, the pair of second side wall portions 78, the pair of third side wall portions 80, the pair of fourth side wall portions 82, and the fifth side wall portion 84 define a side wall portion 85.

Referring to FIG. 5, the opposed portion 74 is preferably pentagonal or substantially pentagonal in a rear view. Referring to FIG. 8, the opposed portion 74 is opposed to the light source portion 60 in Arrow X direction of the light source portion 60. In the present preferred embodiment, Arrow X direction represents the first direction.

Referring to FIG. 6 and FIG. 7, the opposed portion 74 is configured such that its intermediate region slightly bulges in Arrow X direction in a plan view (bottom view). Referring to FIG. 8, the opposed portion 74 extends from top to bottom so that its lower end portion is closer to the light source portion 60 (reverse direction from Arrow X direction) than is its upper end portion in a side view.

Referring to FIG. 3 through FIG. 5, the opposed portion 74 includes a bent portion 74a in its outer edge region. The bent portion 74a bends toward a substantially reverse direction from Arrow X direction (see FIG. 6 through FIG. 8). The pair of first side wall portions 76, the pair of second side wall portions 78, and the fifth side wall portion 84 are connected to the bent portion 74a.

Referring to FIG. 5, the pair of first side wall portions 76 extend from two side regions of the opposed portion 74 in a substantially reverse direction from Arrow X direction (see FIG. 6 through FIG. 8). More specifically, the pair of first side wall portions 76 extend from top to bottom so that its lower end portion is on a more inward side of the cover portion 38 in terms of the left-right direction than is its upper end portion in a rear view. Referring to FIG. 6 and FIG. 7, the pair of first side wall portions 76 extend from two side regions of the opposed portion 74 outward and obliquely forward in the left-right directions of the cover portion 38 in a plan view (bottom view).

Referring to FIG. 5, the pair of second side wall portions 78 extend from two side regions of the opposed portion 74 in a substantially reverse direction from Arrow X direction (see FIG. 6 through FIG. 8) at lower positions than the pair of first side wall portions 76. More specifically, the pair of second side wall portions 78 extend from top to bottom so that its lower end portion is on a more inward side of the cover portion 38 in a left-right direction than is its upper end portion in a rear view. Referring to FIG. 8, the pair of second side wall portions 78 extend from top to bottom so that its lower end portion is closer to the light source portion 60 (reverse direction from Arrow X direction) than is its upper end portion in a side view. The upper end portions of the pair of second side wall portions 78 are connected to the lower end portions of the pair of first side wall portions 76. The lower end portions of the pair of second side wall portions 78 are connected to each other.

Referring to FIG. 3 through FIG. 7, the pair of third side wall portions 80 extend from forward end regions of the pair of first side wall portions 76 in a substantially reverse direction from Arrow X direction (see FIG. 6 and FIG. 7). The forward end portions of the pair of third side wall portions 80 are connected to the rear wall portion 42b of the flange portion 42. Referring to FIG. 5, the pair of third side wall portions 80 extend from top to bottom so that its lower end portion is on a more inward side of the cover portion 38 in terms of the left-right direction than is its upper end portion in a rear view.

Referring to FIG. 3 through FIG. 5, and FIG. 7, the pair of fourth side wall portions 82 extend from forward end regions of the pair of second side wall portions 78 in a substantially reverse direction from Arrow X direction (see FIG. 7). Referring to FIG. 5, the pair of fourth side wall portions 82 extend from top to bottom so that its lower end portion is on a more inward side of the cover portion 38 in terms of the left-right direction than is its upper end portion in a rear view. The upper end portions of the pair of fourth side wall portions 82 are connected to the lower end portions of the pair of third side wall portions 80. The lower end portions of the pair of fourth side wall portions 82 are connected to each other. The forward end portions of the pair of fourth side wall portions 82 are connected to the rear wall portion 42b of the flange portion 42.

Referring to FIG. 3 through FIG. 6, the fifth side wall portion 84 extends from an upper end region of the opposed portion 74 in a substantially reverse direction from Arrow X direction (see FIG. 6). Two side portions of the fifth side wall portion 84 are connected to upper end portions of the pair of first side wall portions 76 and upper end portions of the pair of third side wall portions 80. The forward end portion of the fifth side wall portion 84 is connected to the rear wall portion 42b of the flange portion 42.

Figure 10:
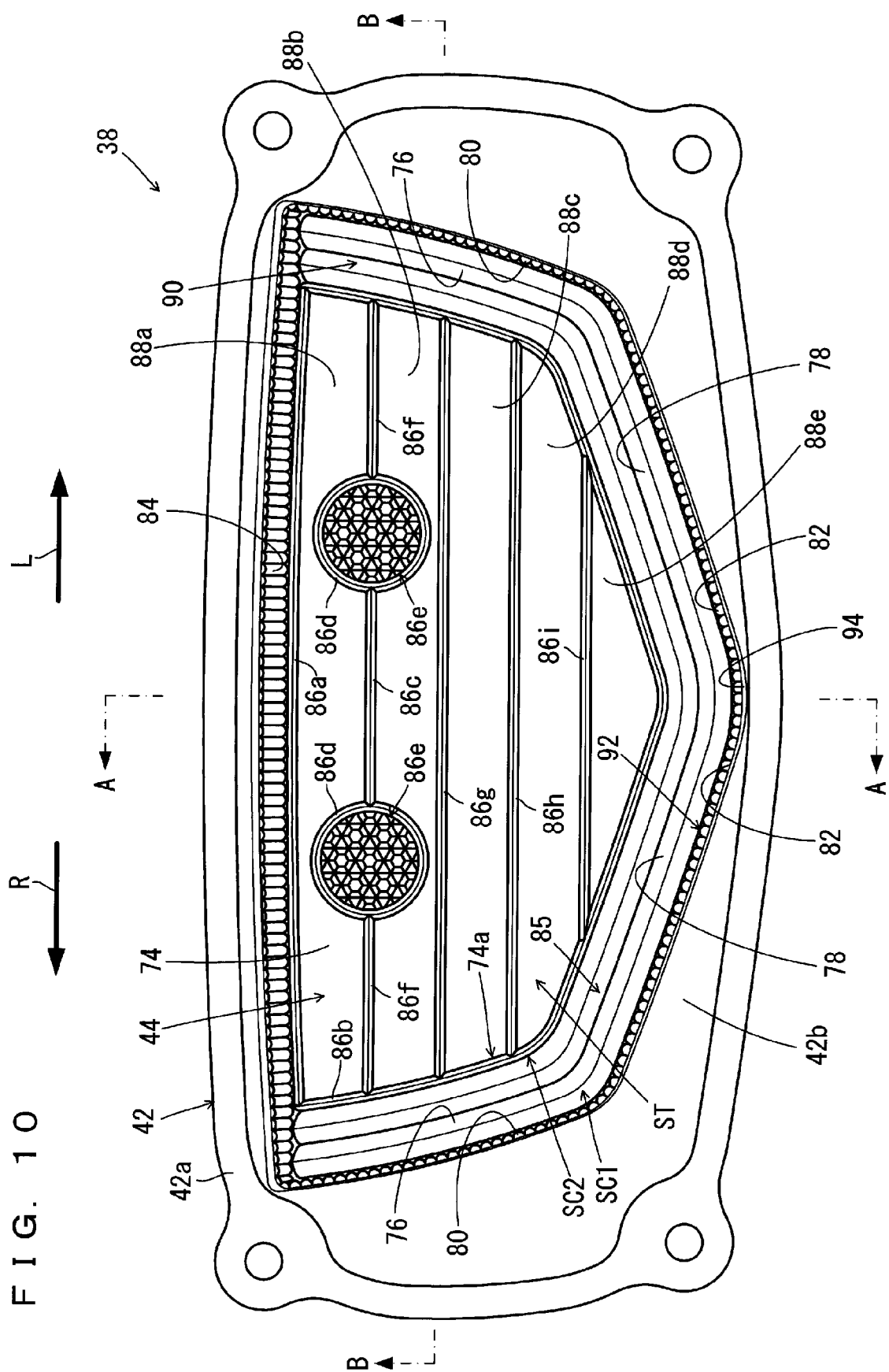
FIG. 10 is a front view of a cover portion.
Figure 11:
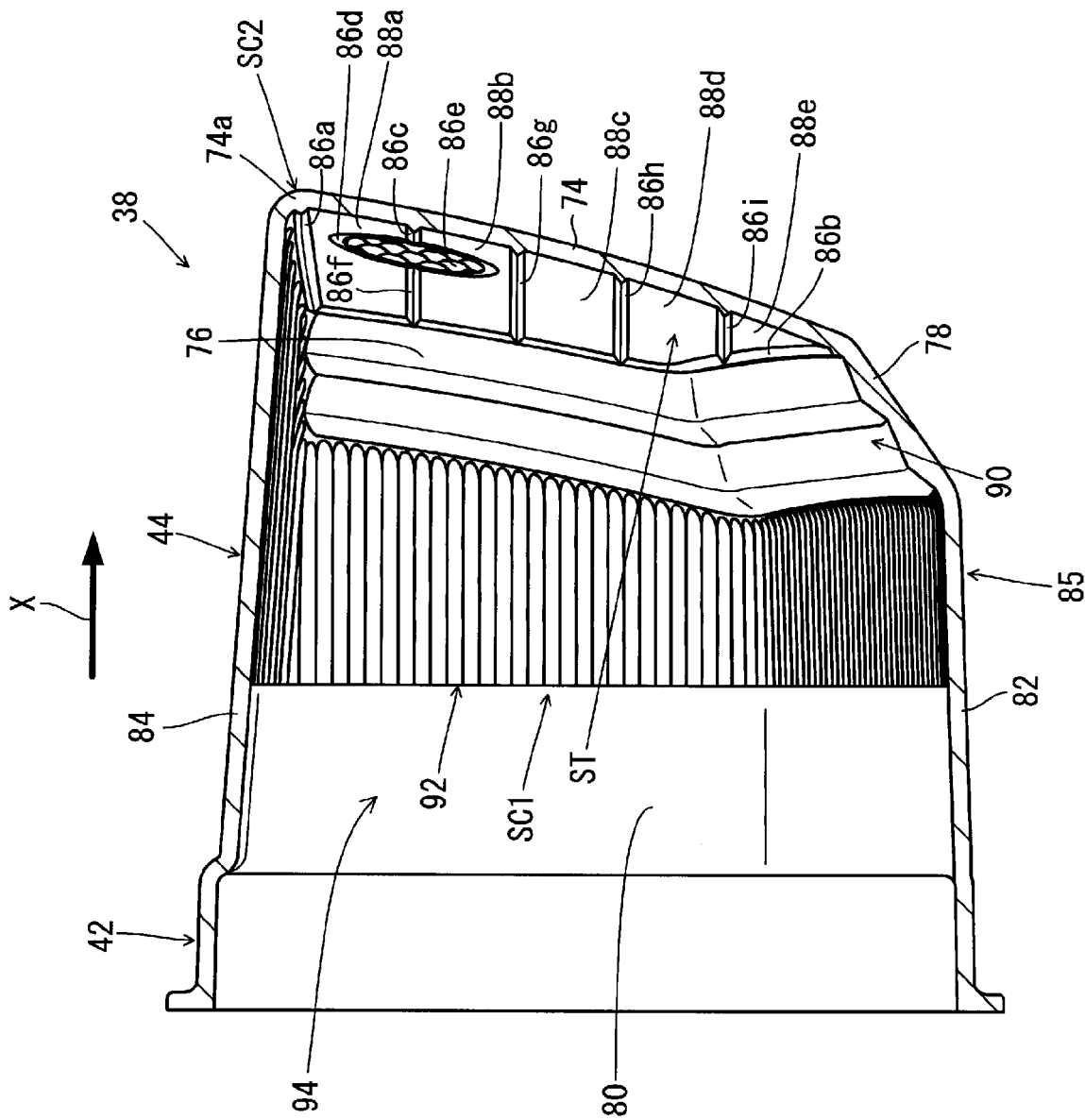
FIG. 11 is a sectional view taken along lines A-A in FIG. 10.
Figure 12:
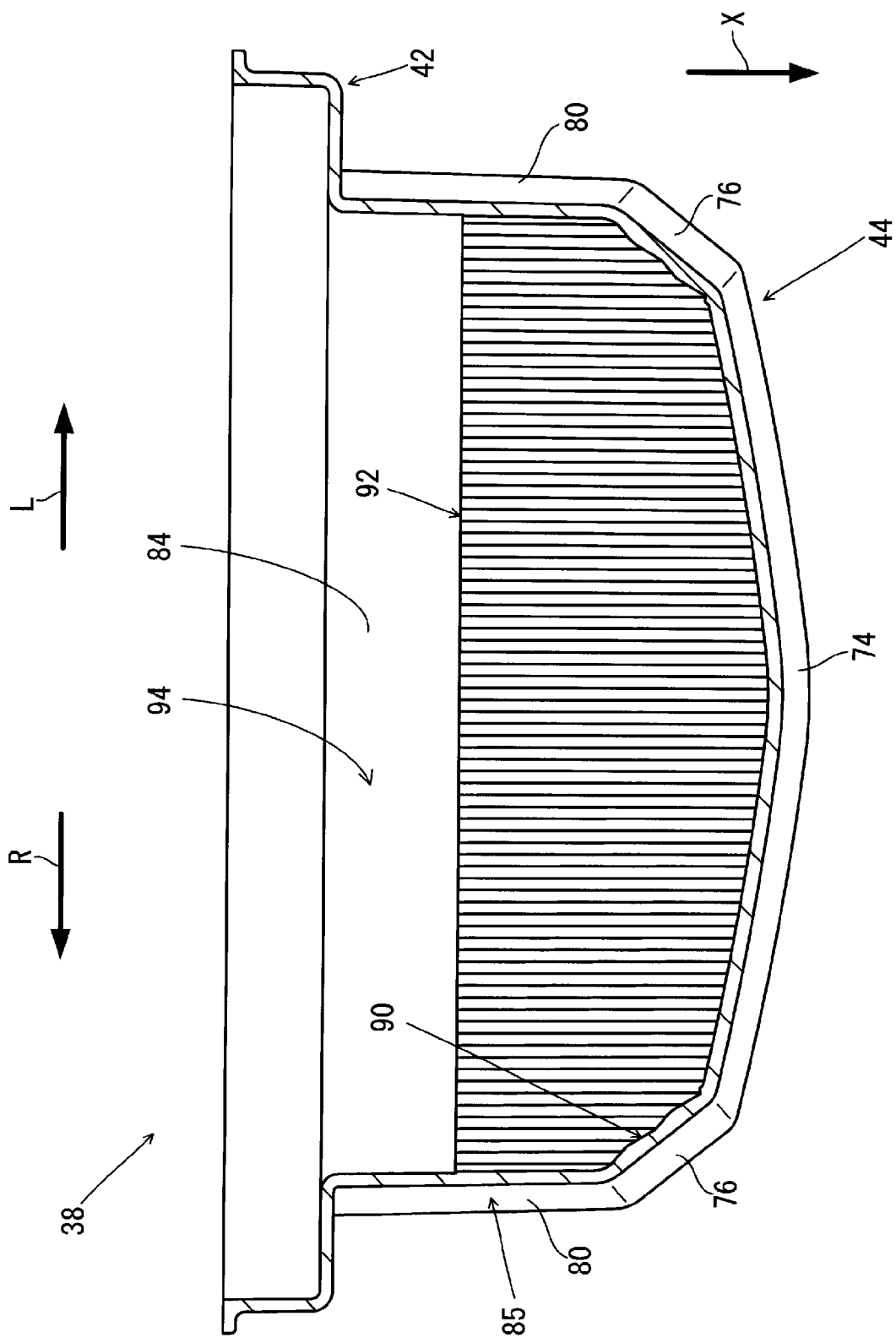
FIG. 12 is a sectional view taken along lines B-B in FIG. 10.

Next, detailed description will be made for a structure of an inner surface of the translucent portion 44. FIG. 10 is a front view of the cover portion 38. FIG. 11 is a sectional view taken along lines A-A in FIG. 10, whereas FIG. 12 is a sectional view taken along lines B-B in FIG. 10. FIG. 11 and FIG. 12 show the flange portion 42 in a simplified manner in order to avoid complicating the drawing.

Referring to FIG. 10 and FIG. 11, the inner surface of the opposed portion 74 includes a plurality of non-flat portions 86a, 86b, 86c, 86d, 86e, 86f, 86g, 86h, 86i. The non-flat portion 86a is a convex surface protruding toward the internal space S (see FIG. 8), and extends in the left-right direction along an upper end region of the opposed portion 74. Referring to FIG. 11, the non-flat portion 86a is defined by a salient which preferably has a triangular or substantially triangular section protruding toward the internal space S (see FIG. 8) on the inner surface side of the opposed portion 74. Likewise, the non-flat portions 86b, 86c, 86d, 86f, 86g, 86h, 86i are also convex surfaces protruding toward the internal space S (see FIG. 8), which are defined by salients that also preferably have triangular or substantially triangular sections on the inner surface side of the opposed portion 74.

Referring to FIG. 10, the non-flat portion 86b extends along an outer edge region (excluding the upper end region) of the opposed portion 74 and is U-shaped or substantially U-shaped in a front view. The non-flat portion 86b has its two end portions connected to two end portions of the non-flat portion 86a. In the present preferred embodiment, the non-flat portions 86a, 86b are provided on an inner surface of the bent portion 74a (see FIG. 11).

The non-flat portion 86c extends in the left-right direction at a lower position than the non-flat portion 86a. The pair of non-flat portions 86d are connected to two end portions of the non-flat portion 86c. Each of the pair of non-flat portions 86d is annular in a front view. The non-flat portion 86e is provided inside each of the non-flat portions 86d. The non-flat portion 86e is a concave-convex surface provided on the inner side of the non-flat portion 86d. The non-flat portion 86e includes a plurality of polygonal concave-convex patterns in a front view on the inner surface side of the opposed portion 74. FIG. 11 shows the non-flat portions 86d, 86e in a simplified manner in order to avoid complicating the drawing.

The pair of non-flat portions 86f extend in the left-right direction to connect the non-flat portion 86b and the pair of non-flat portions 86d to each other. The non-flat portions 86g, 86h, 86i extend in a left-right direction at a lower position than the non-flat portions 86c, 86d, 86e, 86f. The non-flat portions 86g, 86h, 86i have their two end portions connected to the non-flat portion 86b. In the present preferred embodiment, each of the non-flat portions 86g, 86h, 86i is parallel or substantially parallel to the non-flat portions 86c, 86f.

A plurality (five, in the present preferred embodiment) of flat portions 88a, 88b, 88c, 88d, 88e are provided in regions of the inner surface of the opposed portion 74 excluding the non-flat portions 86a, 86b, 86c, 86d, 86e, 86f, 86g, 86h, 86i.

Referring to FIG. 10 and FIG. 11, a non-flat portion 90 extends along the non-flat portion 86b and is U-shaped or substantially U-shaped in a front view. The non-flat portion 90 is a concave-convex surface which extends over a range from inner surfaces of the pair of first side wall portions 76 to inner surfaces of the pair of second side wall portions 78. Referring to FIG. 11, the non-flat portion 90 includes a plurality (two, in the present preferred embodiment) of salients each preferably having a triangular or substantially triangular section on the inner surface side of the pair of first side wall portions 76 and the inner surface side of the pair of second side wall portions 78 to protrude toward the internal space S (see FIG. 8) and extending along the non-flat portion 86b. In the present preferred embodiment, almost all areas in the inner surface of the pair of first side wall portions 76 and the inner surface of the pair of second side wall portions 78 function as the non-flat portion 90.

Referring to FIG. 10 through FIG. 12, a non-flat portion 92 is provided throughout inner surfaces of the pair of third side wall portions 80, inner surfaces of the pair of fourth side wall portions 82 (see FIG. 10 and FIG. 11), and an inner surface of the fifth side wall portion 84. Referring to FIG. 10, the non-flat portion 92 is a concave-convex surface which is provided throughout the inner surfaces of the pair of third side wall portions 80, the inner surfaces of the pair of fourth side wall portions 82, and the inner surface of the fifth side wall portion 84. The non-flat portion 92 includes a plurality of salients each preferably having a shape of a semicircular column protruding toward the internal space S (see FIG. 8) and extending in a fore-aft direction, in the inner surfaces of the pair of third side wall portions 80, the inner surfaces of the pair of fourth side wall portions 82, and the inner surface of the fifth side wall portion 84. The non-flat portion 92 extends from rearward end regions of the third side wall portions 80, rearward end regions of the fourth side wall portions 82, and a rearward end region of the fifth side wall portion 84 in a substantially reverse direction from Arrow X direction (see FIG. 11 and FIG. 12). A region other than the non-flat portion 92, in the inner surfaces of the pair of third side wall portions 80, in the inner surfaces of the pair of fourth side wall portions 82, and in the inner surface of the fifth side wall portion 84 is a flat portion 94.

Referring to FIG. 10 and FIG. 11, the cover portion 38 includes a straight-through portion ST which allows the light emitted from the light source portion 60 to travel straightly, and a first scatter portion SC1 and a second scatter portion SC2 which scatter the light emitted from the light source portion 60. More specifically, the opposed portion 74 includes the straight-through portion ST and the second scatter portion SC2, whereas the side wall portion 85 includes the first scatter portion SC1. In the present preferred embodiment, the straight-through portion ST includes the flat portions 88a, 88b, 88c, 88d, 88e; the first scatter portion SC1 includes the non-flat portion 90 and the non-flat portion 92; and the second scatter portion SC2 includes the bent portion 74a (which includes the non-flat portions 86a, 86b) and the non-flat portions 86c, 86d, 86e, 86f, 86g, 86h, 86i.

In the present preferred embodiment, the non-flat portions 90, 92 correspond to the first non-flat portion, whereas the non-flat portions 86a, 86b, 86c, 86d, 86e, 86f, 86g, 86h, 86i correspond to the second non-flat portion.

Figure 13:
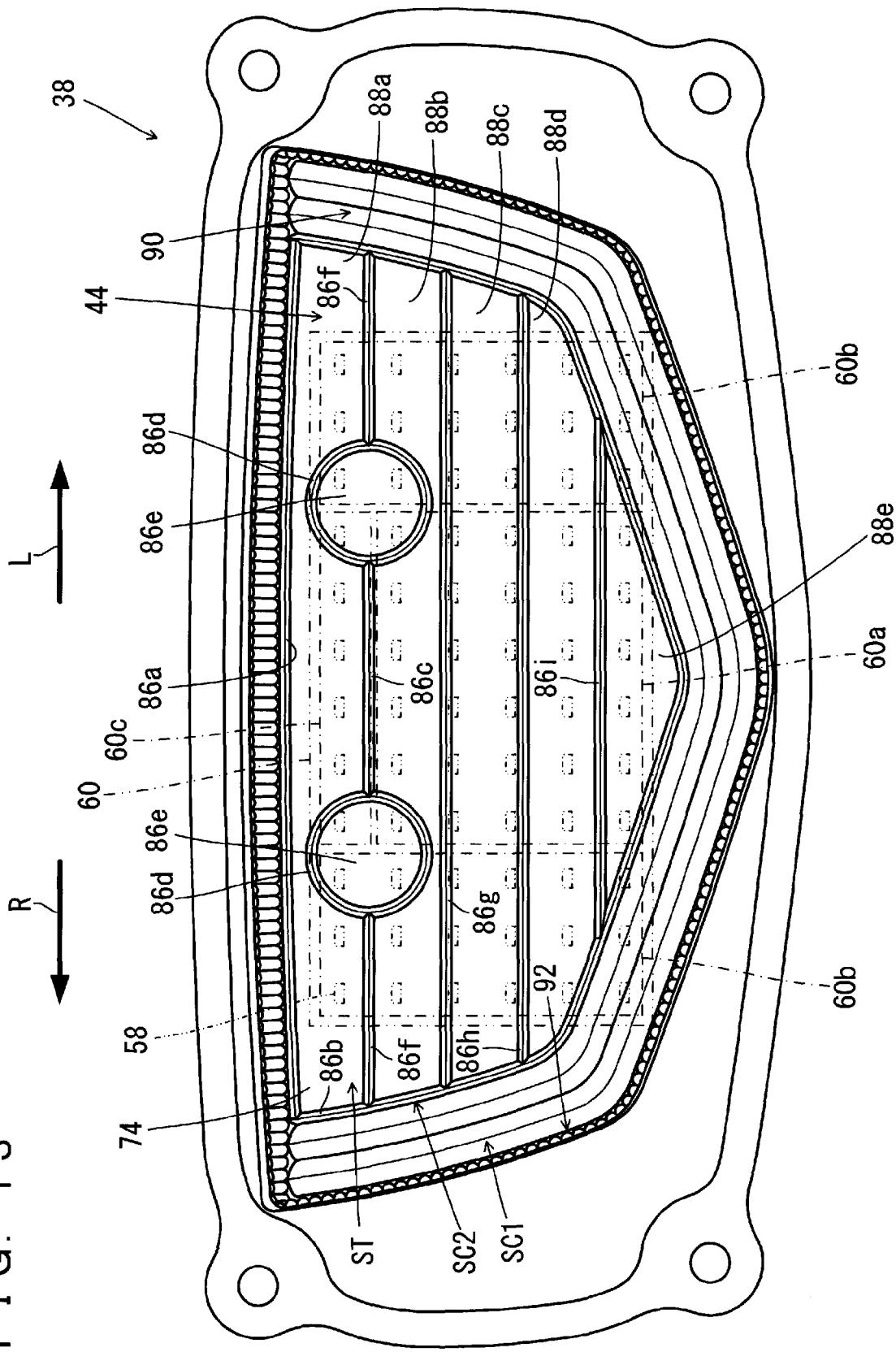
FIG. 13 shows a positional relationship between a translucent portion and a light source portion.

FIG. 13 is a diagram which shows a positional relationship between the translucent portion 44 and the light source portion 60. The positional relationship between the translucent portion 44 and the light source portion 60 shown in FIG. 13 is a relationship when the translucent portion 44 and the light source portion 60 are viewed in Arrow X direction (see FIG. 8). In order to avoid complicating the drawings, FIG. 13 shows the pair of non-flat portions 86e in a simplified manner.

Referring to FIG. 13, when the translucent portion 44 and the light source portion 60 are viewed in Arrow X direction (see FIG. 8), a plurality of the LEDs 58 in the LEDs 58 of the light source portion 60 overlap the non-flat portions 86b, 86d, 86e, 86g, 90, whereas the other plurality of the LEDs 58 overlap the flat portions 88a, 88b, 88c, 88d, 88e.

When the translucent portion 44 and the light source portion 60 are viewed in Arrow X direction (see FIG. 8), each of the non-flat portions 86e overlaps a plurality (for example, four, in the present preferred embodiment) of LEDs 58. In the present preferred embodiment, each of the non-flat portions 86e overlaps one LED 58 which belongs to the first light source portion 60a, two LEDs 58 which belong to the second light source portion 60b, and one LED 58 which belongs to the third light source portion 60c.

Figure 14:
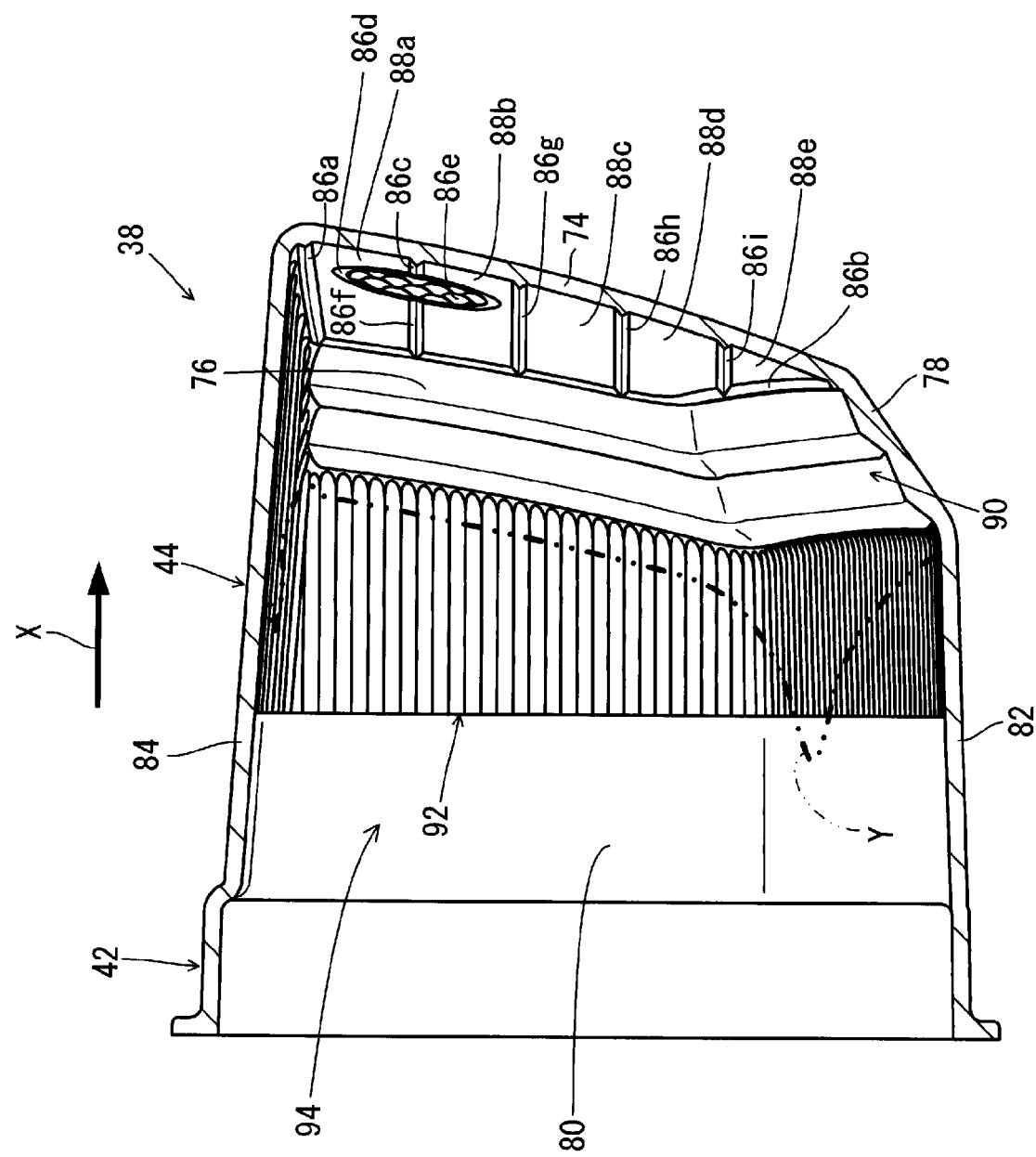
FIG. 14 is a drawing for describing a range of light radiated by the light source portion.
Figure 15:
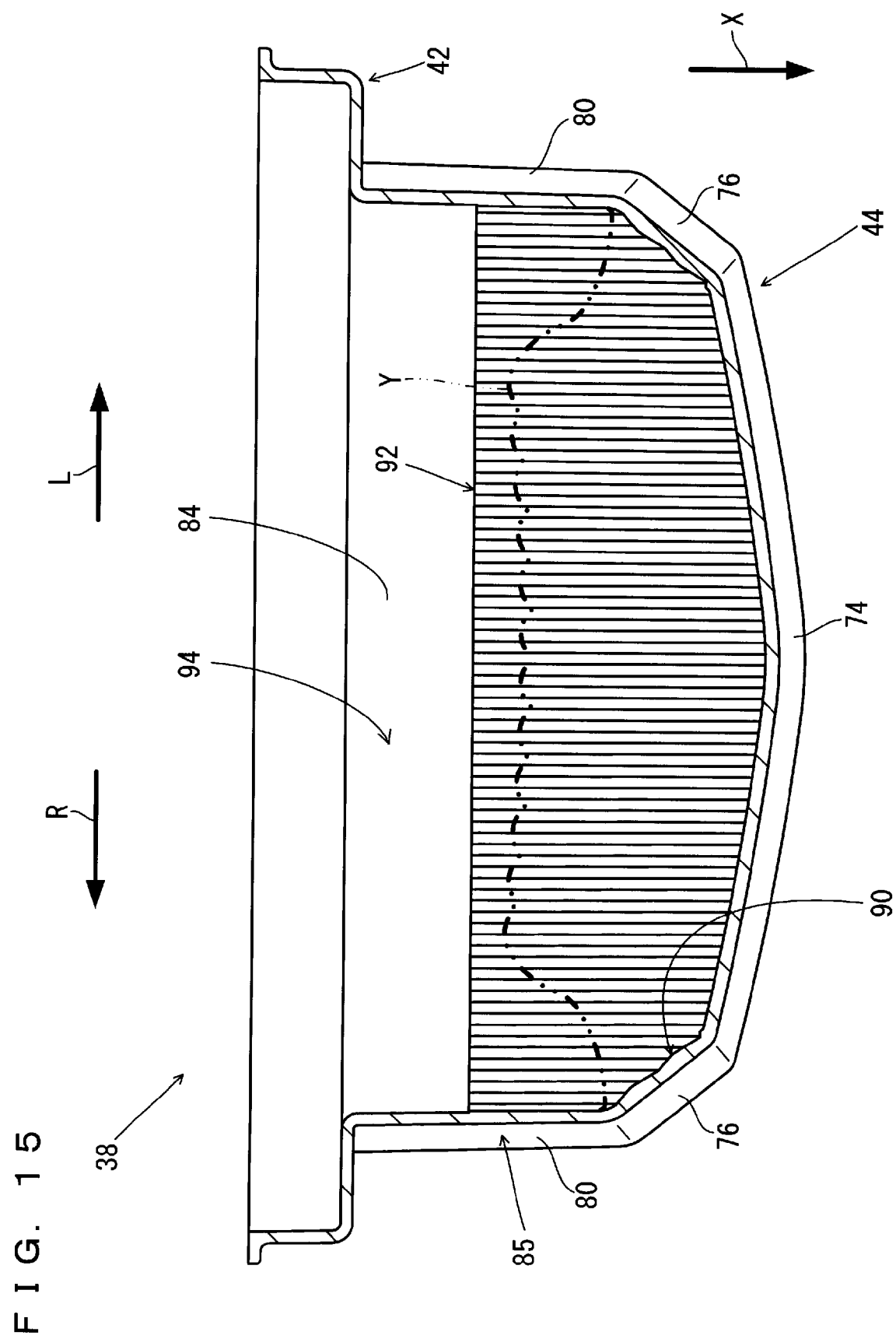
FIG. 15 is a drawing for describing a range of light radiated by the light source portion.

FIG. 14 and FIG. 15 are drawings for describing a range of light radiated by the light source portion 60. Referring to FIG. 14 and FIG. 15, in the display device 12, all regions in the inner surface of the translucent portion 44 which are on the side of Arrow X direction with respect to an alternate long and two short dashes line Y are irradiated by the light emitted from the light source portion 60. Specifically, in the display device 12, all regions of the non-flat portions 86a, 86b, 86c, 86d, 86e, 86f, 86g, 86h, 86i, all regions of the plurality of flat portions 88a, 88b, 88c, 88d, 88e, all regions of the non-flat portion 90, and at least a portion of the non-flat portion 92 are irradiated by the light emitted from the light source portion 60. It should be noted here that the range of light radiation by the light emitted from the light source portion is adjusted appropriately by changing the number of LEDs 58 and the pattern in which the LEDs 58 are disposed.

Figure 16:
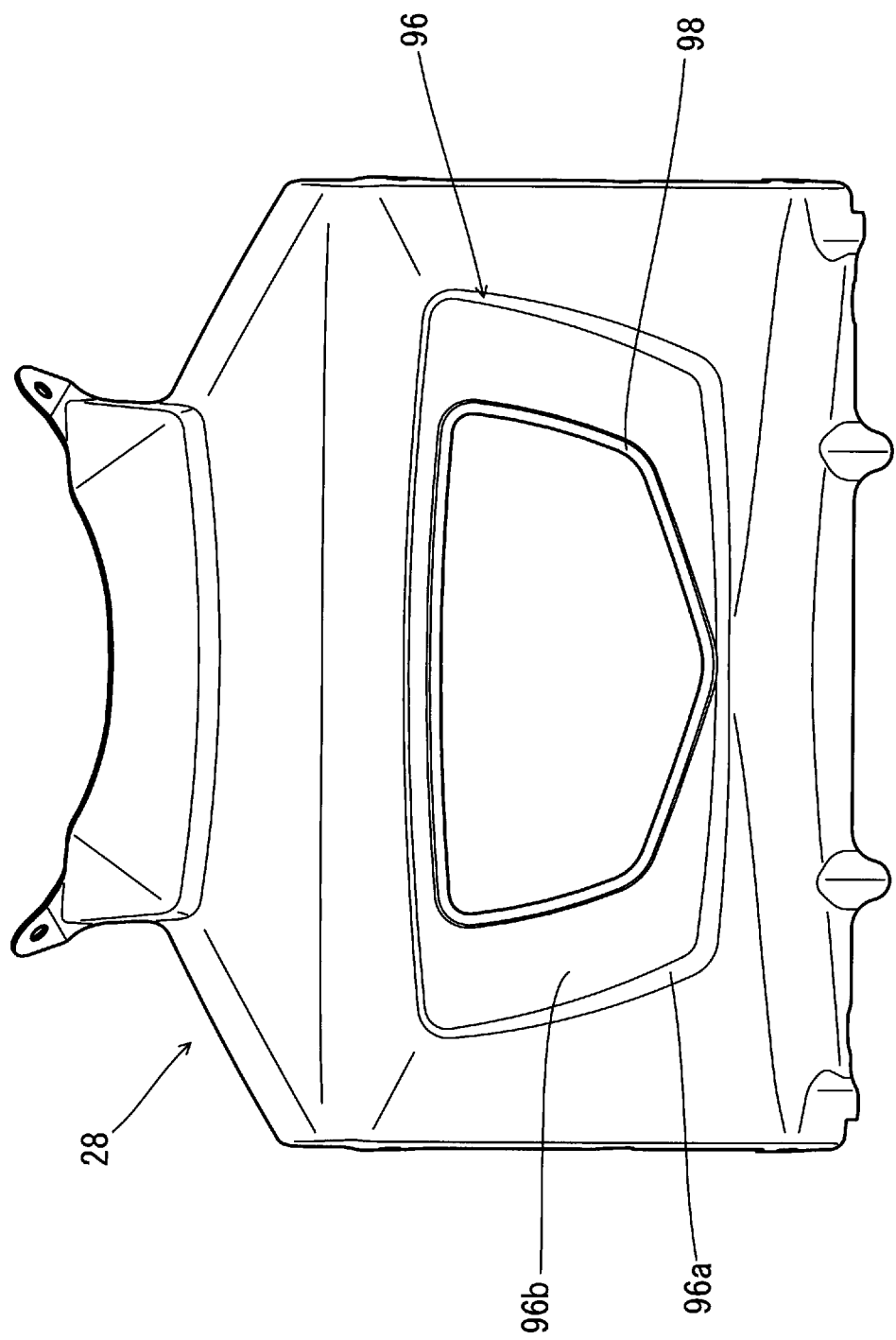
FIG. 16 is a rear view of the under cover.

FIG. 16 is a rear view of the under cover 28.

Referring to FIG. 2 through FIG. 4 and FIG. 16, the under cover 28 includes a holder portion 96 and a guide portion 98 protruding rearward from the holder portion 96. The holder portion 96 includes a tube shaped portion 96a and a flange shaped portion 96b. The tube shaped portion 96a preferably has a substantially inverse-trapezoidal shape in a rear view, and extends in a fore-aft direction. The flange shaped portion 96b connects a rearward end portion of the tube shaped portion 96a and a forward end portion of the guide portion 98 to each other. The guide portion 98 is tube shaped, and pentagonal or substantially pentagonal in a rear view.

Referring to FIG. 2 through FIG. 7, when the display device 12 is attached to the helicopter 10, first, a plurality of buffer members 100 and a plurality of buffer members 102 are attached to the cover portion 38; and a plurality of buffer members 104 (see FIG. 2, FIG. 3, FIG. 6 and FIG. 7) are attached to the cover portion 40. In the present preferred embodiment, referring to FIG. 5, one buffer member 100 is attached to each of the third side wall portions 80, one buffer member 100 is attached to each of the fourth side wall portions 82, two buffer members 100 are attached to the fifth side wall portion 84, and two buffer members 102 are attached to the rear wall portion 42b. Referring to FIG. 6, two buffer members 104 are attached to the front wall portion 46b, and one buffer member 104 is attached to the projected portion 48.

Referring to FIG. 3, the flange portion 42 of the cover portion 38 and the cover portion 40 are housed in the holder portion 96, and the translucent portion 44 protrudes rearward from the guide portion 98 when the under cover 28 is placed over the display device 12 from rear. In the present preferred embodiment, the area of the side wall portion 85 provided with the non-flat portion 92 (see FIG. 11) protrudes to a more rearward position than the guide portion 98 under the state where the under cover 28 is attached. In this state, the plurality of buffer members 100, 102 are sandwiched by the under cover 28 and the cover portion 38.

While the display device 12 with the under cover 28 is being held, the display device 12 is pressed onto the battery box 36 so that the opposed portion 74 faces obliquely rearward and downward. At this time, the plurality of buffer members 104 are sandwiched by the battery box 36 and the cover portion 40. Under this state, the under cover 28 is attached to the tail body 20 and the frame 24 as shown in FIG. 1. As a result, the display device 12 is supported by the tail body 20 and the frame 24. As described above, the display device 12 is placed in a rear portion of the main body 14, below the tail body 20 so that the human operator who remotely operates the helicopter 10 can see the display device 12 from the rear of the helicopter 10.

Hereinafter, description will describe the functions and advantages of the display device 12.

The display device 12 includes the light source portion 60 which includes a plurality of LEDs 58; and the cover portions 38, 40 which cover the light source portion 60. The cover portion 38 includes the opposed portion 74 which is opposed to the light source portion 60 in Arrow X direction of the light source portion 60; and the side wall portion 85 which extends from an outer edge of the opposed portion 74 in a substantially reverse direction from Arrow X direction. The opposed portion 74 includes the straight-through portion ST, whereas the side wall portion 85 includes the first scatter portion SC1.

In the arrangement described above, according to the display device 12, a portion of light emitted from the light source portion 60 is directed to the straight-through portion ST of the opposed portion 74. A portion of the light directed to the straight-through portion ST travels straightly through the straight-through portion ST, and then out of the cover portion 38 (the opposed portion 74). In other words, the portion of the light emitted from the light source portion 60 to the cover portion 38 passes therethrough and then leaves the cover portion 38 to the outside without being scattered in the cover portion 38. This improves the visibility of the display device 12 from a distance in Arrow X direction. Namely, this improves the visibility of the display device 12 from the rear of the helicopter 10.

A different portion of the light directed to the straight-through portion ST of the opposed portion 74 repeats reflection inside the opposed portion 74, and reaches the side wall portion 85. The portion of the light which arrived at the side wall portion 85 is then scattered by the first scatter portion SC1. Of the light emitted from the light source portion 60, a portion of the light reflected by the inner surface of the cover portion 38 is directed to the side wall portion 85. The portion of the light which is directed to the side wall portion 85 is then scattered by the first scatter portion SC1. This improves the visibility of the display device 12 from directions across Arrow X direction (from a side, for example). Namely, this improves the visibility of the display device 12 from the sides of the helicopter 10.

As a result of these, it is possible to improve the visibility of the display device 12 in a wide range while improving the visibility of the display device 12 from a distance.

The opposed portion 74 includes the second scatter portion SC2. In this case, it is possible to scatter another portion of the light emitted from the light source portion 60 in the second scatter portion SC2. This further improves the visibility of the display device 12 from directions other than from Arrow X direction (especially from the sides).

When the cover portion 38 and the light source portion 60 are viewed from Arrow X direction, the light source portion 60 overlaps the non-flat portions 86b, 86d, 86e, 86g of the second scatter portion SC2. In this case, it is possible to reliably scatter a portion of the light emitted from the light source portion 60 in Arrow X direction with the non-flat portions 86b, 86d, 86e, 86g. In other words, it is possible to further improve the visibility of the display device 12.

When the cover portion 38 and the light source portion 60 are viewed from Arrow X direction, the straight-through portion ST overlaps a portion of the plurality of LEDs 58 whereas the non-flat portions 86b, 86d, 86e, 86g of the second scatter portion SC2 overlap another portion of the plurality of LEDs 58. In this case, light emitted by a portion of the plurality of LEDs 58 in Arrow X direction is directed to the straight-through portion ST, and is allowed to travel out of the cover portion 38 without being scattered in the opposed portion 74. This sufficiently improves the visibility of the display device 12 from a distance in Arrow X direction. On the other hand, light emitted from another portion of the plurality of LEDs 58 in Arrow X direction is directed to the non-flat portions 86b, 86d, 86e, 86g of the second scatter portion SC2 and scattered in the non-flat portions 86b, 86d, 86e, 86g. This also sufficiently improves the visibility of the display device 12 from directions other than from Arrow X direction (especially from the sides).

The light source portion 60 includes the first light source portion 60a and the pair of second light source portions 60b which emit light in a color different from that emitted from the first light source portion 60a. When the cover portion 38 and the light source portion 60 are viewed from Arrow X direction, the first light source portion 60a is located between the pair of second light source portions 60b, and each of the second light source portions 60b is located between the first light source portion 60a and the side wall portion 85. Also, when the cover portion 38 and the light source portion 60 are viewed from Arrow X direction, the pair of non-flat portions 86e and the non-flat portion 86g of the second scatter portion SC2 overlap a plurality of the LEDs 58 of the first light source portion 60a. According to the arrangement described above, when the cover portion 38 and the light source portion 60 are viewed from Arrow X direction, the pair of second light source portions 60b are closer to the side wall portion 85 than is the first light source portion 60a. This improves the visibility of light emitted from the pair of second light source portions 60b from the sides. Also, a portion of the light emitted from the first light source portion 60a in Arrow X direction is scattered by the pair of non-flat portions 86e and the non-flat portion 86g. This also improves the visibility of the light emitted from the first light source portion 60a from the sides. Further, when the cover portion 38 and the light source portion 60 are viewed from Arrow X direction, the pair of non-flat portions 86e and the non-flat portion 86g of the second scatter portion SC2 overlap a plurality of the LEDs 58 of the second light source portions 60b. In the arrangement described above, a portion of the light emitted from the second light source portions 60b in Arrow X direction is scattered by the pair of non-flat portions 86e and the non-flat portion 86g. This improves the visibility of the light emitted from the second light source portion 60b sufficiently from the sides.

When the cover portion 38 and the light source portion 60 are viewed from Arrow X direction, the non-flat portion 86e in the second scatter portion SC2 overlaps the first light source portion 60a, the second light source portion 60b, and the third light source portion 60c. In this case, it is possible to reliably scatter not only the light which is emitted by the first light source portion 60*a* in Arrow X direction but also the light which is emitted by the second light source portion 60*b* and the third light source portion 60*c* in Arrow X direction in the non-flat portion 86*e*. This further improves the visibility of light which is emitted from the second light source portions 60*b* and the third light source portion 60*c* from the sides.

The second light source portions 60*b* includes the warning LEDs 58. In the display device 12, in a view from Arrow X direction, the pair of second light source portions 60*b* are closer to the side wall portion 85 than is the first light source portion 60*a*. For this reason, the light which is emitted from the pair of second light source portions 60*b* has better visibility from the sides than does the light which is emitted from the first light source portion 60*a*. Therefore, the arrangement that the pair of second light source portions 60*b* include warning LEDs 58 improves the visibility of the light which is emitted from the warning LEDs 58 from the sides.

The opposed portion 74 also scatters the light which is emitted from the light source portion 60 in the bent portion 74*a*. As described above, according to the display device 12, it is possible to scatter light with a simple arrangement.

The non-flat portions 90, 92 are provided on the inner surface of the side wall portion 85, whereas the non-flat portions 86*a*, 86*b*, 86*c*, 86*d*, 86*e*, 86*f*, 86*g*, 86*h*, 86*i* are provided on the inner surface of the opposed portion 74. In this case, the arrangement prevents dust and dirt from depositing on the non-flat portions 86*a*, 86*b*, 86*c*, 86*d*, 86*e*, 86*f*, 86*g*, 86*h*, 86*i*, 90, 92, making it easy to clean the cover portion 38.

When the cover portion 38 and the light source portion 60 are viewed from Arrow X direction, the non-flat portion 90 of the first scatter portion SC1 overlaps a portion of the plurality of LEDs 58 in the pair of second light source portions 60*b*. In this case, the arrangement reliably scatters the light which is emitted from the second light source portions 60*b* in Arrow X direction in the non-flat portion 90. This sufficiently improves the visibility of the light emitted from the second light source portions 60*b* from the sides. It should be noted here that the first light source portion may be arranged so that the LEDs 58 in the first light source portion and the non-flat portion 90 overlap each other when viewed from Arrow X direction.

A plurality of buffer members 100, 102, 104 preferably are provided between the display device 12, the under cover 28, and the battery box 36. This prevents large vibrations from developing in the display device 12 and thus, further improves the visibility of the display device 12.

The display device 12 includes the control substrate 56, as a separate component from the LED substrate 54, configured or programmed to control the light source portion 60. In this case, the operational cost of the display device 12 is reduced because only the LED substrate 54 should be repaired or replaced if a failure occurs in the light source portion 60.

In the display device 12 there is a gap (space) between the LED substrate 54 and the control substrate 56. This prevents the control substrate 56 from being affected by heat generated by the plurality of LEDs 58.

In the display device 12, the number of LEDs 58 in the pair of second light source portions 60*b* is preferably greater than the number of LEDs 58 in the first light source portion 60*a*, and preferably greater than the number of LEDs 58 in the third light source portion 60*c*. With this arrangement, the operator of the helicopter 10 recognizes the light (warning light, for example) which is emitted by the second light source portions 60*b* more reliably.

In the display device 12 described above, there may be an arrangement that a reflection member is adhesively attached or a reflection coating is applied at any place on the inner surface of the cover portion 38 (for example, upper portions of inner surfaces in the pair of first side wall portions 76, upper portions of inner surfaces in the pair of third side wall portions 80, or an inner surface of the fifth side wall portion 84). This further improves the visibility of the display device 12.

In the preferred embodiments described above, the opposed portion 74 and the side wall portion 85 are preferably integral with each other. However, there may be an arrangement that the opposed portion and the side wall portion are separate from each other.

In the preferred embodiments described above, the non-flat portion 92 is preferably provided also in the fifth side wall portion 84. However, it is not necessary to provide a non-flat portion in the fifth side wall portion.

In the preferred embodiments described above, the display device 12 preferably includes the LED substrate 54 and the control substrate 56. However, there may be an arrangement that a single substrate which includes the function of the LED substrate 54 and the function of the control substrate 56 is utilized in place of the LED substrate 54 and the control substrate 56.

In the preferred embodiments described above, the first scatter portion SC1 and the second scatter portion SC2 are preferably provided by a convex surface and a concave-convex surface on the inner surface of the cover portion 38. However, there may be an arrangement that the first scatter portion and/or the second scatter portion are provided by a concave surface (s) on the inner surface of the cover portion. Also, the first scatter portion and/or the second scatter portion may be provided by a convex surface, a concave surface, or a concave-convex surface on an outer surface of the cover portion. Also, the first scatter portion and/or the second scatter portion may be formed by applying a scattering agent on a portion of the cover portion.

In the preferred embodiments described above, the bent portion 74*a* is preferably provided on the outer edge of the opposed portion 74, such that the opposed portion 74 and the side wall portion 85 are clearly bordered from each other. However, it is not necessary to provide the bent portion on the outer edge of the opposed portion. Therefore, it is acceptable, for example, that the translucent portion is hemispherical or substantially hemispherical and does not have a clear border between the opposed portion and the side wall portion.

In the preferred embodiments described above, the light emitted from the light source portion 60 preferably travels straightly inside of the translucent portion 44 (excluding the outer surface and the inner surface) without being scattered. However, there may be an arrangement in which a scatter portion that scatters light is provided inside the translucent portion.

Figure 17:
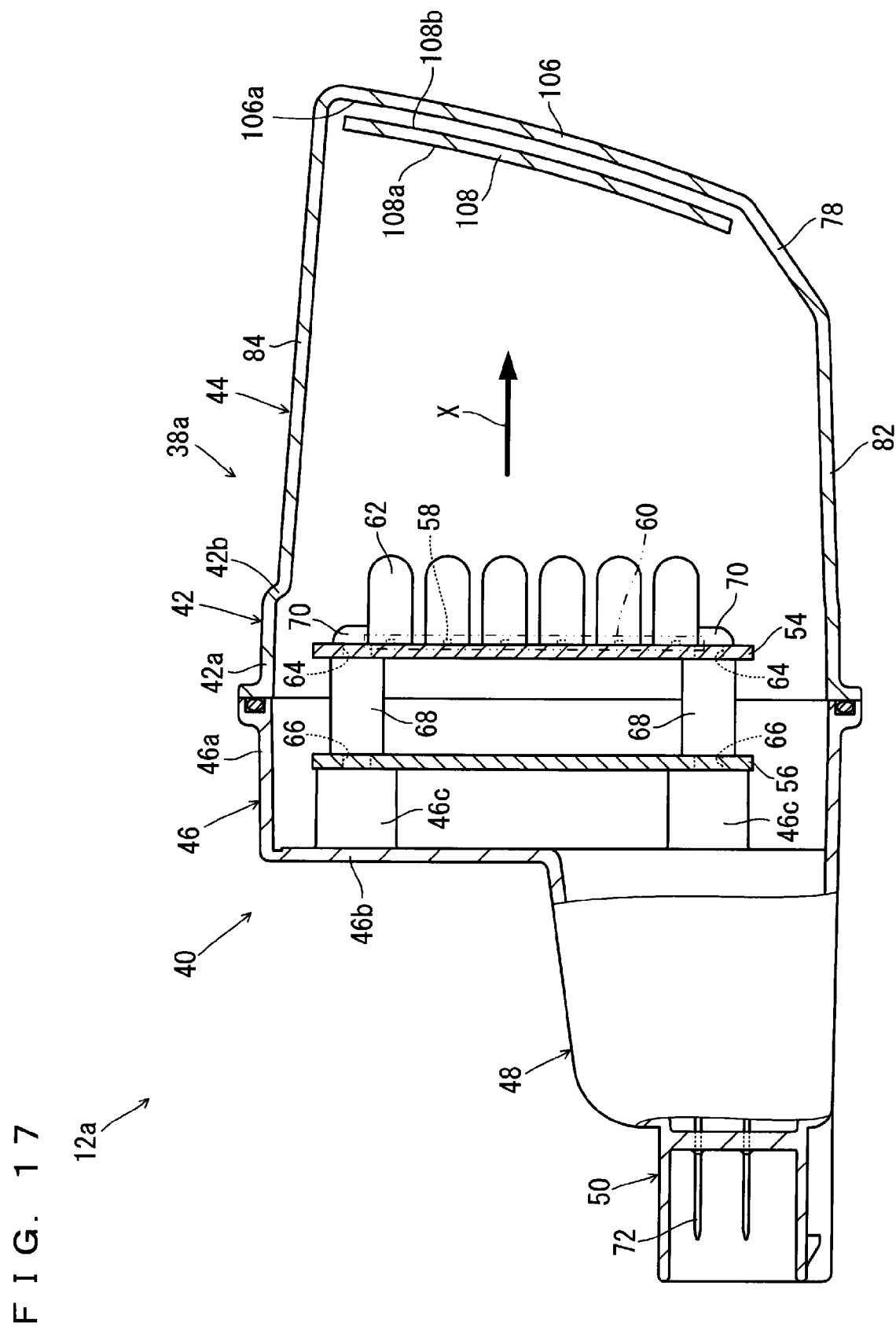
FIG. 17 is an illustrative side view of a display device according to another preferred embodiment of the present invention.

FIG. 17 is an illustrative side view of a display device 12*a* according to another preferred embodiment of the present invention. The display device 12*a* shown in FIG. 17 differs from the above-described display device 12 in that a cover portion 38*a* is utilized in place of the cover portion 38. The cover portion 38*a* differs from the cover portion 38 in that it includes an opposed portion 106 in place of the opposed portion 74, and further includes an opposed portion 108. Therefore, no more description will be given about the cover portion 38*a* other than for the opposed portions 106, 108.

The opposed portion 106 differs from the opposed portion 74 in that the opposed portion 106 has its inner surface 106*a* not provided with the non-flat portions 86*a*, 86*b*, 86*c*, 86*d*, 86*e*, 86*f*, 86*g*, 86*h*, or 86*i*. In other words, all regions in the inner surface 106*a* of the opposed portion 106 are flat surfaces.

The opposed portion 108 is opposed to the light source portion 60 in Arrow X direction, between the light source portion 60 and the opposed portion 106. The opposed portion 108 has its inner surface 108a the same as the inner surface of the opposed portion 74, including a plurality of non-flat surfaces and a plurality of flat surfaces. As another arrangement, a plurality of non-flat surfaces and a plurality of flat surfaces may be provided on an outer surface 108b of the opposed portion 108, or both surfaces (inner surface 108a and outer surface 108b) thereof.

The display device 12a scatters the light emitted from the light source portion 60 in the plurality of non-flat surfaces of the opposed portion 108. Therefore, the display device 12a provides the same functions and advantages as offered by the display device 12. Also, since the display device 12a does not require a plurality of non-flat surfaces in the opposed portion 106, it offers an advantage that the opposed portion 106 is simple. The opposed portion 108 may be spaced from the opposed portion 106, or may be attached adhesively onto the inner surface 106a of the opposed portion 106. In addition, the side wall portion may also be configured like the opposed portions 106, 108.

The arrangements in the first scatter portion and the second scatter portion to scatter the light from the light source portion 60 are not limited to those described above, and may be changed as appropriate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An unmanned helicopter comprising:
a display device, the display device including:
 a light source portion including an LED that emits light at least in a first direction; and
 a cover portion covering the light source portion while being exposed to an outside; wherein
the cover portion includes an opposed portion opposed to the light source portion in the first direction of the light source portion, and a side wall portion extending from an outer edge of the opposed portion in a reverse direction from the first direction;
the opposed portion includes a straight-through portion which allows light emitted from the light source portion to travel straightly;
the side wall portion includes a first scatter portion which scatters the light emitted from the light source portion; and
the first scatter portion is provided on a portion of the side wall portion which extends from top to bottom so that its lower end portion is on a more inward side of the cover portion in terms of a left-right direction than is its upper end portion in a rear view, and the first scatter portion is visible in a bottom view.

2. The unmanned helicopter according to claim 1, wherein the first scatter portion is provided on a pair of second side wall portions of the side wall portion, which extend from top to bottom so that their lower end portions are on a more inward side of the cover portion in terms of a left-right direction than are their upper end portions in a rear view, with the lower end portions of the pair of second side wall portions being connected to each other.

3. The unmanned helicopter according to claim 1, wherein the opposed portion further includes a second scatter portion which scatters the light emitted from the light source portion; and
the second scatter portion is provided on a portion of the opposed portion which extends from top to bottom so that its lower end portion is closer to the light source portion than is its upper end portion in a side view, and the second scatter portion is visible in a bottom view.

4. The unmanned helicopter according to claim 3, wherein the second scatter portion overlaps the light source portion when viewed from the first direction.

5. The unmanned helicopter according to claim 3, wherein the light source portion includes a plurality of LEDs, the straight-through portion overlaps a portion of the plurality of LEDs, and the second scatter portion overlaps another portion of the plurality of LEDs when viewed from the first direction.

6. The unmanned helicopter according to claim 3, wherein the light source portion includes a first light source portion and a pair of second light source portions which emit light of a different color from that emitted by the first light source portion;
the first light source portion is located between the pair of second light source portions and each of the second light source portions is located between the first light source portion and the side wall portion when viewed from the first direction; and
the second scatter portion overlaps the first light source portion when viewed from the first direction.

7. The unmanned helicopter according to claim 6, wherein the second scatter portion further overlaps the second light source portion when viewed from the first direction.

8. The unmanned helicopter according to claim 6, wherein the pair of second light source portions include warning LEDs.

9. The unmanned helicopter according to claim 3, wherein the second scatter portion includes a bent portion.

10. The unmanned helicopter according to claim 1, wherein the first scatter portion includes a non-flat portion on an inner surface of the side wall portion.

11. The unmanned helicopter according to claim 3, wherein the second scatter portion includes a non-flat portion on an inner surface of the opposed portion.

* * * * *